(12) United States Patent
Starsinic et al.

(10) Patent No.: US 11,576,042 B2
(45) Date of Patent: Feb. 7, 2023

(54) IDENTITY LAYER FOR IOT DEVICES

(71) Applicant: InterDigital Patent Holdings, Inc., Wilmington, DE (US)

(72) Inventors: Michael F. Starsinic, Newtown, PA (US); Dale N. Seed, Allentown, PA (US); Catalina Mihaela Mladin, Hatboro, PA (US); Hongkun Li, Malvern, PA (US); Joseph M. Murray, Schwenksville, PA (US); Rocco Di Girolamo, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/056,610

(22) PCT Filed: May 17, 2019

(86) PCT No.: PCT/US2019/032830
§ 371 (c)(1),
(2) Date: Nov. 18, 2020

(87) PCT Pub. No.: WO2019/222604
PCT Pub. Date: Nov. 21, 2019

(65) Prior Publication Data
US 2021/0235266 A1    Jul. 29, 2021

Related U.S. Application Data

(60) Provisional application No. 62/673,337, filed on May 18, 2018.

(51) Int. Cl.
*H04W 60/04* (2009.01)
*H04W 12/06* (2021.01)
*H04W 8/18* (2009.01)
*H04W 8/20* (2009.01)
*H04W 68/02* (2009.01)

(52) U.S. Cl.
CPC .......... *H04W 12/06* (2013.01); *H04W 8/183* (2013.01); *H04W 8/205* (2013.01); *H04W 68/02* (2013.01)

(58) Field of Classification Search
None
See application file for complete search history.

(56) References Cited

U.S. PATENT DOCUMENTS 9,516,620 B1    12/2016 Upp et al.
2009/0191871 A1    7/2009 Siegel et al.
(Continued)

FOREIGN PATENT DOCUMENTS

EP    2086167 A1    8/2009

*Primary Examiner* — Gary Lafontant
(74) *Attorney, Agent, or Firm* — BakerHostetler

(57) ABSTRACT

It is recognized herein that capabilities are lacking related to how different users can be authenticated on top of an existing subscription authentication. In some examples, a user-centric authentication layer may be supported on top of an existing subscription authentication, such that different users may use the same user equipment (UE) with customized services, and different users of devices can be identified behind a gateway with a 3GPP subscription (without the devices having a dedicated 3GPP subscription). Further, a user identifier may be linked to a subscription to access 3GPP services via non-3GPP access.

19 Claims, 17 Drawing Sheets

(56) References Cited

U.S. PATENT DOCUMENTS

| | | | |
|---|---|---|---|
| 2013/0203412 A1* | 8/2013 | Starsinic | H04W 4/70 455/435.1 |
| 2014/0208389 A1 | 7/2014 | Kelley | |
| 2018/0199398 A1* | 7/2018 | Dao | H04L 67/148 |
| 2018/0227221 A1* | 8/2018 | Starsinic | H04L 45/306 |

* cited by examiner

IDENTITY LAYER FOR IOT DEVICES

CROSS-REFERENCE TO RELATED APPLICATIONS

This application is the National Stage Application of International Patent Application No. PCT/US2019/032830, filed May 17, 2019; which claims the benefit of U.S. Provisional Application No. 62/373,337, filed on May 18, 2018, titled "IDENTITY LAYER FOR IOT DEVICES," the contents of which are hereby incorporated herein by reference in their entirety.

BACKGROUND

In the 3GPP system, an International Mobile Subscriber Identity (IMSI) is a subscription identifier. An IMSI consists of three fields: a Mobile Country Code (MCC), a Mobile Network Code (MNC), and a Mobile Subscription Identification Number (MSIN). In the 3GPP system, an International Mobile Equipment Identity (IMEI) is a device identifier used to identify a given user equipment (UE). In an IEEE 802 system, a Media Access Control (MAC) Address is a device identifier used to identify a network interface controller. With respect to user identifiers, it is recognized herein that capabilities are lacking related to how different users can be authenticated on top of an existing subscription authentication.

SUMMARY

In some examples, a user-centric authentication layer may be supported on top of an existing subscription authentication, such that different users may use the same user equipment (UE) with customized services, and different users of devices can be identified behind a gateway with a 3GPP subscription (without the devices having a dedicated 3GPP subscription). Further, a user identifier may be linked to a subscription to access 3GPP services via non-3GPP access.

In an example, a UE receives a user identity, and in response to a triggering event, sends a request message to the network. The request message may include user identity and session information that is to be associated with the user identity. The request message may further include a General Registration Request, a Service Request, a PDU Session Establishment Request, a PDU Modification Request, or a PDU Session Release Request. The request message may also include a list of users that are permitted to access the network via the UE. The UE may receive a response from the network, and the response may include an indication of whether the session information is allowed to be associated with the user identity. The user identity may be received via a graphic user interface of the UE or from a capillary device that is communication with the UE, or from an application that is running on the UE. Thus, the user identity may identify a human user of the UE, a capillary device in communication with the UE, or an application. In some examples, the triggering event is the user identity being received by the UE. Other example triggering events include when the UE transitions from a locked state to an unlocked state; when data is received, by the UE, from a capillary device in communication with the UE; or a paging message or a non-access stratum (NAS) message being received by the UE. Such a paging message may include the user identity. For example, the UE may send a second message to the network that indicates that the UE supports receiving paging notifications or NAS notifications that include the user identity. Further, the UE may receive broadcast information indicating that the network supports paging based on the user identity, and the UE can send the request message to the network based on receiving the broadcast information. Using the user identity, the UE may perform an authentication with the network of a user associated with the user identity. In an example, the session information is Protocol Data Unit (PDU) session information. In another example, the UE sends a second request message to the network to inform the network that the user identity is no longer associated with the UE. Such a second request message may be a registration request, or a message that may be sent in response to a paging notification or NAS notification.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

As an initial matter, as used herein, capillary devices refer to devices that connect to the 3GPP network via a user equipment (UE) acting as a gateway or a relay. A capillary device may or may not have a subscriber identity module (SIM). Examples of capillary devices include wearable sensors and smart home devices, such as door locks and smart appliances for example. A user may refer to a person or device that has an identity that may be separate from any subscription. As used herein, unless otherwise specified, subscriber and subscription may be used interchangeably, without limitation.

Turning now to protocol data unit (PDU) procedures, 5G registration, PDU Establishment, and Service Request procedures may be used to activate, reactivate, and deactivate PDU sessions. Table 1 below shows example information concerning these procedures and a configuration update procedure.

nication is enabled and the Policy Control Function (PCF), User Data Management (UDM), or Short Message Service-Service Center (SMS-SC) has something to send to a given UE, the Access and Mobility Management Function (AMF) holds the message until the UE becomes CM-CONNECTED (instead of paging the UE).

Figure 1:
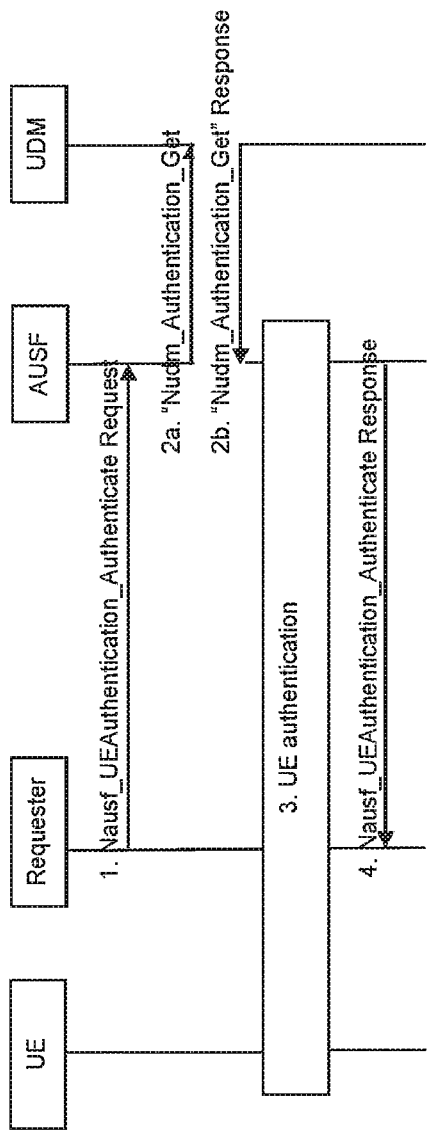
FIG. 1 is a call flow showing a 5G authentication procedure for a user equipment (UE).

With respect to authentication with the 5G core network (5GC), FIG. 1 depicts an example of 5G UE authentication. The AMF may invoke the Nausf_UEAuthentication_Authenticate procedure during UE registration to authenticate the UE, using the UE's subscription permanent identifier (SUPI) (e.g., IMSI).

A network slice may be identified with a Single Network Slice Selection Assistance Information (S-NSSAI.) The S-NSSAI may consist of a Slice/Service Type (SST) and a Slice Differentiator (SD). An NSSAI is a collection of S-NSSAI's. There are different types of NSSAI's. The configured NSSAI is the NSSAI that a given UE is configured to use. The UE may have a different configured NSSAI in each PLMN. The configuration may include instructions for how to map the configured NSSAI to the HPLMN configured NSSAI. The requested NSSAI is provided to the network by the UE at registration. The network may use the requested NSSAI to determine which network nodes should serve the UE and and to determine which network slices to which the UE should be allowed to connect. At the completion of registration, the network provides the UE with an allowed NSSAI. The allowed NSSAI is a list of slices that the UE is allowed to access.

A PDU Session may be associated with an S-NSSAI and a data network name (DNN). In a PDU Session establish-

TABLE 1

Registration, PDU Establishment, Service Request, and Configuration Update Procedures

| Procedure | When Triggered | Who Can Trigger | Impact on PDU Sessions |
| --- | --- | --- | --- |
| Registration | Initial Registration Mobility Periodic Renegotiate Parameters | UE | PDU Sessions can be reactivated |
| PDU Session Establishment | Application Layer Activity that requires a new PDU Session. UE activity that causes a PDU session to move between 3GPP and non-3GPP | UE Network (via a Trigger) | Used to create a new PDU session. Used to move a PDU session between 3GPP and non-3GPP access. |
| Service Request | UE wants to activate a user plane connection for an already established PDU Session. UE wants to generate uplink signaling (other than registration or de-registration). UE wants to respond to a page or a NAS notification. | UE Network (via Paging or NAS Notification) | When responding to a page, UE does not know what PDU Session is needed, so it tells the network what PDU Sessions it can activate. UE will be told what PDU sessions are being activated when RRC Configuration happens. |
| Configuration Update (Parameters that require no UE-Network Negotiation) | AMF wants to change parameters PCF wants to provide new policies | Network | N/A |

The 5G network supports a feature called Asynchronous Type Communication. When Asynchronous Type Communication request sent to the network, the UE may provide a PDU Session Identifier (ID). The PDU Session ID is unique per UE and is the identifier used to uniquely identify one of the UE's PDU Sessions. The PDU Session ID may be stored in the user data management (UDM) to support handover between 3GPP and non-3GPP access when different PLMNs are used for the two accesses.

A UE Route Selection Policy (URSP) is a policy that may be provided by the Policy Control Function (PCF) in the 5GC to the UE. These policies are used by the UE to determine how to route outgoing traffic. In various examples, traffic can be routed to an established PDU Session, can be offloaded to non-3GPP access outside a PDU Session, or can trigger the establishment of a new PDU Session. A given URSP may include an SSCMSP (SSC Mode Selection Policy) that is used to map traffic to a Session and Service Continuity (SSC) mode. URSPs may include an NSSP (Network Slice Selection Policy) that is used to map traffic to an S-NSSAI. URSPs may include a DNN Selection Policy that is used to map traffic to a DN. URSPs may include access network preferences that are used to map traffic to an access network type. A given UE may also have local preferences that can be used to determine how to treat traffic. In some cases, local preferences take precedence over URSPs.

Figure 2:
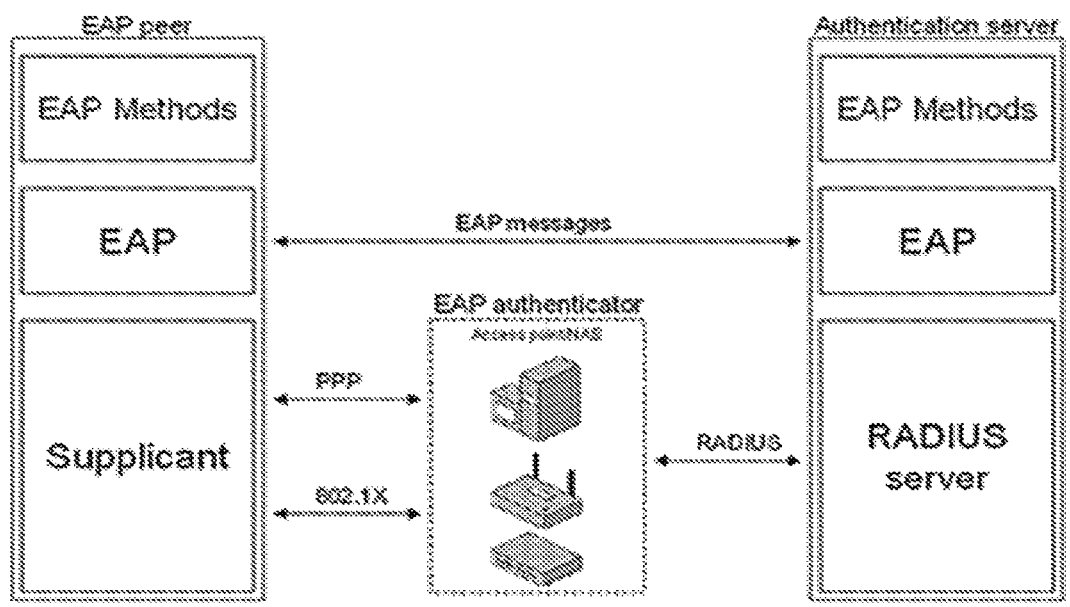
FIG. 2 is a block diagram of a generic Extensible Authentication Protocol (EAP) architecture.

Turning now to the Extensible Authentication Protocol (EAP), EAP is a common authentication framework that can be used to implement specific authentication methods. EAP is a protocol that allows the Peer, Authenticator, and Authentication Server to negotiate which authentication method will be used. The selected authentication method may then run inside of the EAP protocol. EAP is defined in RFC 3748, which further describes the EAP packet format, procedures, and basic functions, such as negotiation of the desired authentication mechanism. FIG. 2 shows a block diagram of the basic EAP architecture. EAP can use Radius or Diameter.

In some cases, it is not sufficient to describe an authentication mechanism as EAP because there is some underlying authentication method. There are many EAP methods defined by IETF. For purposes of example, it is assumed herein that the selected EAP method is EAP-AKA, which is based on UMTS-AKA and defined in RFC 4187, though it will be understood that other underlying authentication methods may be used. That is, in accordance with various examples, embodiments may be implemented regardless of the selected EAP authentication method.

Turning now to the Protocol for Carrying Authentication for Network Access (PANA), EAP was designed as a link layer (Layer 2) protocol, and PANA is a protocol that can be used to carry EAP messages over an IP network. Thus, PANA may be a transport for EAP. PANA runs on top of the network (IP) layer. PANA is defined in RFC 5191. PANA allows dynamic service provider selection, supports various authentication methods, is suitable for roaming users, and is independent from the link layer mechanisms.

In some cases, a 3GPP system or network is able to identify devices and subscribers. For example, when a UE attaches to the network, the device (UE) can be identified by its permanent equipment identifier (PEI) (e.g., IMEI), and the subscriber that is associated with the UE can be identified by the subscription permanent identifier (SUPI) (e.g., IMSI). It is recognized herein that, in some cases, the current 3GPP system is not able to identify the user of a UE. It is further recognized herein that the 3GPP network treats each device based on the subscriber identity that is associated with the UE, and therefore the network may be unaware of who is using the UE. In some cases, for example, a UE may be shared by multiple users. In this example scenario, it is recognized herein that the 3GPP system is not able to identify the person using the UE, and thus is not able to apply different value added services (e.g., parental controls) when a UE is being used by someone other than the subscriber (e.g., a child of the subscriber).

It is further recognized herein that addressing the technical problem of identifying users may be valuable in the Internet of Things (IoT). For example, referring to FIG. 3, a capillary device 302, such as a wearable device or smart home appliance (with no SIM), can connect to a remote server 304 by using a UE 306 as a gateway or relay to a core network 308. However, the user of the capillary device 302 might not be the subscriber that is associated with the UE 306. For example, a medical device 302 that is worn by a sick person might use a friend's UE 306 to connect to the Internet 308. When the UE 306 sends data to the network 308, the 3GPP system (e.g., core network 308) might need to be able to authenticate and authorize the user identity that is associated with the capillary device 302, identify what traffic comes from the capillary device 302, and apply different services/policies to the traffic that comes from the capillary device 302 as compared to the services/policies that are applied to the traffic that is generated by applications that are hosted on the UE 306.

Figure 3:
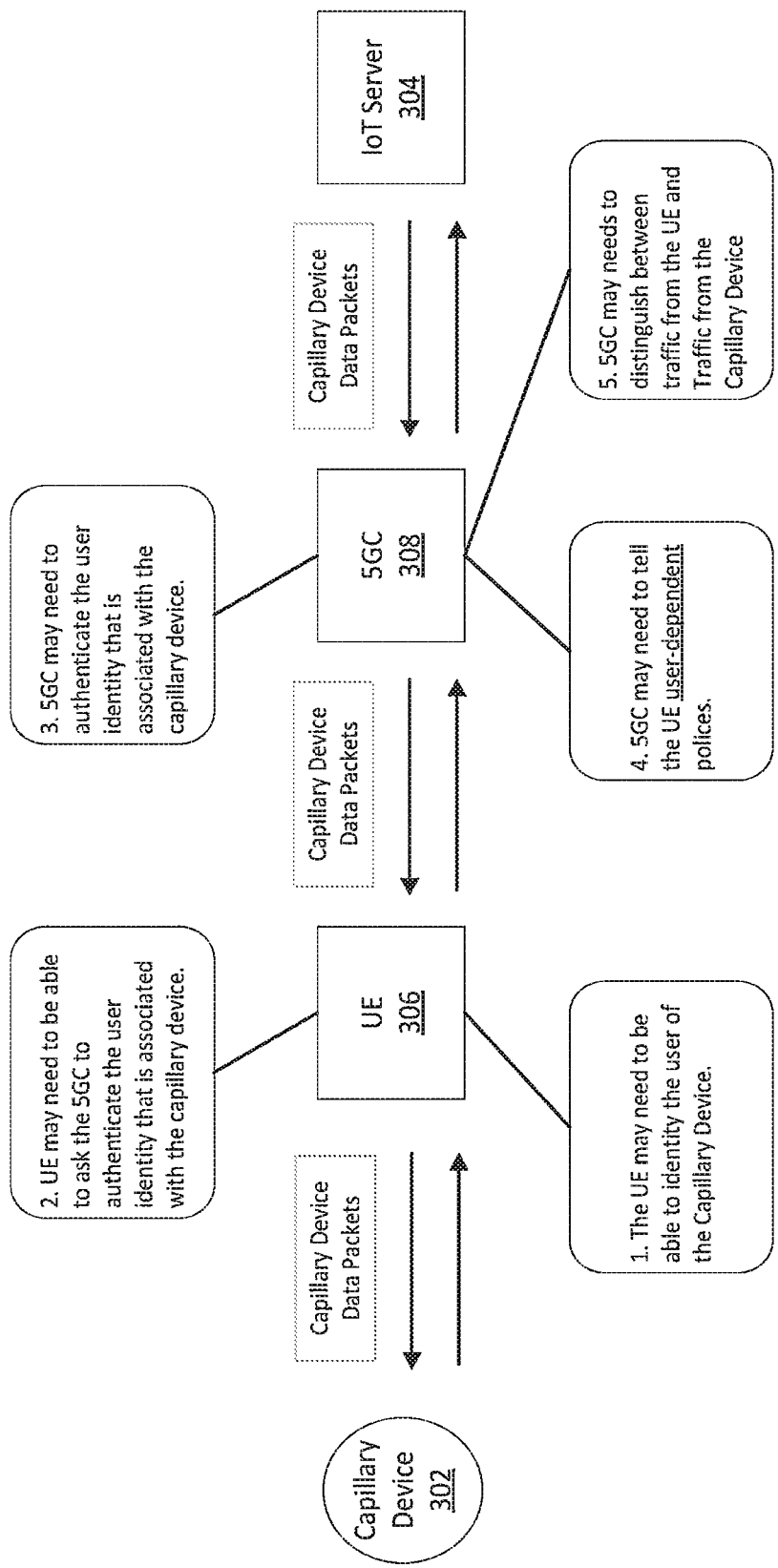
FIG. 3 depicts an example use case in which a capillary device uses a user identity to access a 5G core network (5GC).

Various embodiments described herein address issues exemplified by FIG. 3, among other technical problems. For example, in an example, a core network (e.g., 3GPP 5GC) can identify users. A user may refer to a person or device that has an identity that is separate from (e.g., independent of) the subscription that is being used to carry the traffic. Furthermore, if a UE is being used to send the traffic to the 5GC, then the user may have an identity that is also separate from the UE. A user identity and a 3GPP User-Identity may be used interchangeable herein, without limitation, unless otherwise specified. Further, a core network or 5GC may be used interchangeably herein, without limitation, unless otherwise specified.

The 3GPP User-Identity may identify a user and a mobile network operator (MNO) that is associated with the user. The MNO may have a business relationship with the user. The MNO may be responsible for authenticating and authorizing user requests, and may be responsible for maintaining information record(s) that are associated with the user. The information records that are maintained are discussed further herein.

In an example, because the 3GPP User-Identity identifies at least two entities (user and MNO), it may have two parts. For example, it may be formatted as: user-name@mno-name. The user-name may be an alpha numeric string that resolves to a user identity. The mno-name may be an alpha numeric string that resolves to an MNO identity. An MNO identity may consist of an MCC (Mobile Country Code) and a MCN (Mobile Network Code).

There may be different formats of 3GPP User-Identities. For example, an external format may be used on interfaces that are external to the 5GC and an internal format may be used on interfaces that are internal to the 5GC. A resolution, or translation, function on the edge of the 5GC may translate 3GPP User-Identities between internal and external as the messages cross the 5GC boundary.

There may also be different types of 3GPP User-Identities. An example type of 3GPP User-Identity may identify a person. The identity may then be used by the person each time he or she accesses the 5GC, regardless of which device he uses to access the 5GC. For example, a 3GPP User-Identity may identify a child. The child may use the same 3GPP User-Identity when accessing the 5GC from his mother's UE, father's UE, or a friend's UE.

Another type of 3GPP User-Identity may identify a non-3GPP device. For example, in some cases, a 3GPP User-Identity may only be associated with a particular non-3GPP device (e.g., a smart watch).

The format of the 3GPP User-Identity or a field with the 3GPP User-Identity may identify what type of user the 3GPP User-Identity represents (e.g., user or a device). Thus, in some examples, user and device may be used interchangeably herein.

The 3GPP User-Identity format may be further extended with a field, for instance a third field, that identifies the device or a subscription that is being used to access the system. For example, the user identity may be formatted as: user-name.addtional-field@mno-name. In the example, the additional-field identifies the device (e.g., PEI) or subscription (e.g., IMSI or External Identifier) that is being used by the user to access the 3GPP system. The additional-field may be useful for the case where user-names may be specific to a device or subscription. For example, a device, or subscription, may be configured to support certain user-names.

The 3GPP User-Identity format may be further extended with another field, for instance a fourth field, that identifies the role of the user. As an example, the user's role may be a standard-user, a guest-user, or an admin-user. A standard-user may be a user who is identifiable to the MNO. An admin-user may be a user is identifiable to the MNO but has additional privileges. For example, an admin-user might require a different level of authentication that users that indicate other roles. An admin-user might be allowed to access special types of slices. For example, slices that that allow the admin-user to access special network diagnostic capabilities. A guest-user might be a user that is not identifiable to the MNO, however, the device or subscription owner might be willing to host the guest user's traffic. For example, if the guest-user's traffic comes from a UE with an SUPI, the subscription information that is associated with the SUPI may indicate that it is willing to sponsor traffic for guest users or for certain guest users.

There also may be internal and external 3GPP User-Identities. In an example, internal 3GPP User-Identities are not generally exposed outside of the 3GPP system and external 3GPP User-Identities are used when accessing the system externally (e.g., via third party application functions (AF's) or a UE)). Network Functions (NF's) such as the AMF, UDM/UDR, or a network exposure function (NEF) may translate external 3GPP User-Identities to internal 3GPP User-Identities. Internal 3GPP User-Identities may be a type of SUPI. Although examples described herein illustrate how an NEF may be used to interface between the 5GC and a given AF, it will be understood that the examples are presented to facilitate description of the disclosed subject matter and is not intended to limit the scope of this disclosure. Other devices, systems, and configurations may be used to implement the embodiments disclosed herein, and all such embodiments are contemplated as within the scope of the present disclosure. For example, an AAA-proxy may be used as an interface between the 5GC and a given AF that is an AAA Server.

The 3GPP User-Identity format may be further extended with another field, for instance a fifth field, that provides biometric data that has been captured by the UE. For example, a fifth field may indicate that the field includes a particular type of biometric data (e.g., an eye/retina scan result or fingerprint scan result) and may further indicate the result (e.g. numbers or values that represents the eye/retina scan result or fingerprint scan result). When this field is provided to the 5GC, it may be considered part of the user identity. In an example, the 5GC does not recognize the user unless the field matches or is close to the expected value that is stored in the network for the user. Alternatively, the information in the field may be considered as a value that is separate from the user identity and may be used by the 5GC to authenticate and authorize the user.

Turning now to information that may be stored in the network, the unified data repository (UDR) stores subscription data. In an example, the UDR is enhanced to also store user data. For example, UDR queries may require a data set identifier. The data set identifier identifies the subscription, or key (e.g., SUPI/IMSI), and what data from the subscription record is desired in response to query. The UDR may be enhanced to support data set identifiers that identify users (via 3GPP User-Identity) and which data from the user records is desired in response to the query. The user record may include information that is listed in Table 2, presented by way of example and without limitation.

Network Functions in the 5GC may access information in User Records by directly querying the UDR or querying the UDR via the UDM. In an example, UDR and UDM services are updated to allow for Network Functions to query for information that is associated with users. Alternatively, in another example, user records may be stored in a repository that is separate from the UDR and accessed directly from the repository or via a front-end interface, such as the UDM.

TABLE 2

Example User Record Information

| Example Field | Description |
| --- | --- |
| 3GPP User-Identity | The 3GPP User-Identities (internal and external) that are associated with the user |
| User Type | Roaming User - able to be used from multiple devices. Static Association - identifies a device, e.g., the user identity can only be used from one device. |
| Associated PEI(s) | Equipment Identifiers of devices that might be used to access the 5G Core Network with the 3GPP User-Identity. An example of a PEI might be an IMEI or a MAC Address. |
| Role | Admin, Guest, Standard |
| Current PEI | Equipment Identifiers of device that is currently used to access the 5G Core Network |
| Associated SUPI(s) | Subscription Identifiers associated with devices that might be used to access the 5G Core Network with the 3GPP User-Identity. A SUPI might be an IMSI. |
| Current SUPI | Subscription Identifier of device that is currently used to access the 5G Core Network |
| Associated Locations(s) | Locations where the 3GPP User Location may be used or Locations where the device that is currently used to access the 5G Core Network may be. |
| Restricted Location(s) | Locations where the 3GPP User Location may not be used or Locations where the device that is currently used to access the 5G Core Network May not be. |
| Current Location | Location of device that is currently used to access the 5G Core Network by this user |
| Associated Serving Network Names | The networks that the user may use to access the 3GPP system. |

TABLE 2-continued

Example User Record Information

| Example Field | Description |
| --- | --- |
| Associated Access Types | The access types that the user may use to access the 3GPP system. |
| Associated/restricted DNNs | Data networks associated with or restricted for the user |
| Associated/restricted NFs | Network Functions allowed or restricted for the user |
| Associated URSPs | User-specific UE Route Selection Policies to be used for the associated flows |
| Sponsored User Identifier | An additional identifier for the user which can be used to correlate it to sponsored flows. For example, this field may indicate the name of an entity that is willing to sponsor data flows that are associated with the user. It may identify another user, subscription, or application function. |
| Authentication Method | The preferred method for authenticating the user. |
| Allowed NSSAI | The network slices that the user is allowed to access. |
| Relay Indication | An indication of whether the user is allowed to access the system via a relay. |
| Allowed/Permitted Timer | Allowed (or disallowed) times when the user is allowed to access the network. |
| User AMBR | The user's AMBR |
| User Data Limit | The user's maximum amount of data per unit of time. |
| User Credentials | Credentials that must be presented by the user during authentication or information that can be used to derive the credentials that the user will present during authentication. |

In order to support the 3GPP User-Identity described herein, the subscription record may be updated to include one or more of the following new fields, presented by way of example in Table 3, without limitation:

TABLE 3

Example Subscription Record Information

| Field | Description |
| --- | --- |
| Associated 3GPP User-Identity List | List of 3GPP User-Identities that are currently associated with this subscription |
| Allowed 3GPP User-Identity List | List of 3GPP User-Identities that are allowed with this subscription |
| Forbidden 3GPP User-Identity List | List of 3GPP User-Identities that are forbidden with this subscription |
| Allow Guest Users Flag | A flag that indicates that guest users are permitted to access the network with this subscription. |
| Guest User Names | Specific guest users that are allowed to access the network with this subscription. |

Example scenarios in which the 3GPP User-Identity may be used are now discussed. In one example, a 3GPP device initiates a direct network connection. The 3GPP User-Identity may be used to access the 5G network with a 3GPP device that has a SIM and associated subscriber credentials provisioned. For example, a smart phone may allow different users (e.g., parents and children) to log into the device. The smart phone may then indicate the 3GPP User-Identity to the 5GC network so that the network can adjust services that are applied based on the 3GPP User-Identity. For example, parental controls may be applied to traffic when a child's 3GPP User-Identity is used.

In another example, a non-3GPP device initiates a direct network connection. A 3GPP User-Identity may be used to allow a non-3GPP device, possibly with no SIM or associated subscriber credentials provisioned, to directly access the 5GC. The non-3GPP device (e.g., a Wi-Fi video camera or a Wi-Fi tablet) may connect to the 5GC via a Non-3GPP Interworking Function (N3IWF). The owner of the 3GPP User-Identity might be able to use the 3GPP User-Identity to connect to the network via any number of devices (e.g., different Wi-Fi tablets) or, in other examples, the 3GPP User-Identity might be associated with only a single device (e.g., the Wi-Fi video camera).

In another example, a non-3GPP device has an indirect connection. A 3GPP User-Identity may be used to allow the non-3GPP device, possibly with no SIM or associated subscriber credentials provisioned, to indirectly access the 5GC via a 3GPP device. In some cases, the non-3GPP device (e.g., a Bluetooth medical monitoring device) might have no subscriber credentials associated with it, but it may have a 3GPP User-Identity. The 3GPP device (e.g., smart phone) may have a SIM and the associated subscriber credentials provisioned. When the non-3GPP device connects to the 3GPP device, in an example, the 5GC network is able to authenticate the 3GPP User-Identity that is presented by the non-3GPP device. The user may also provide user credential(s) to the network when authenticating. In various examples, when the 3GPP device sends and receives traffic that is associated with the non-3GPP device, the network is able to identify whether the traffic is associated with the non-3GPP device or the 3GPP device.

Another example of a capillary device connecting to the 5GC via a 3GPP device is the case where a vehicle, such as a taxi, has an embedded UE that acts as a gateway for capillary devices. When a passenger enters the taxi, a medical monitoring device that is attached to the passenger (e.g., the capillary device) may use protocols such as WiFi or Bluetooth to connect to the gateway in order to obtain a connection to the 5GC and send data to a remote server. The 3GPP User-Identity and associated credentials may be provided to the GW (e.g., UE) via application layer messaging on top of the WiFi or Bluetooth connection, or a GUI in the vehicle may allow the passenger to provide the device 3GPP User-Identity and associated credentials directly to the GW (e.g., UE).

In some cases, a user may use their 3GPP User-Identity to contact a device and obtain service or data from the device. For example, a person may be using their laptop with a broadband connection. The person may attempt to contact a video camera that is connected to the 3GPP 5GC so that it can view the video stream provided by the video camera. The user may present his 3GPP User-Identity to the 5GC to obtain access to the video camera. Alternatively, the user may use a network application (e.g., AF/AS) to access the camera and provide the camera with a 3GPP User-Identity and user credential(s). The camera (UE) may then authenticate the 3GPP User-Identity.

Figure 4:
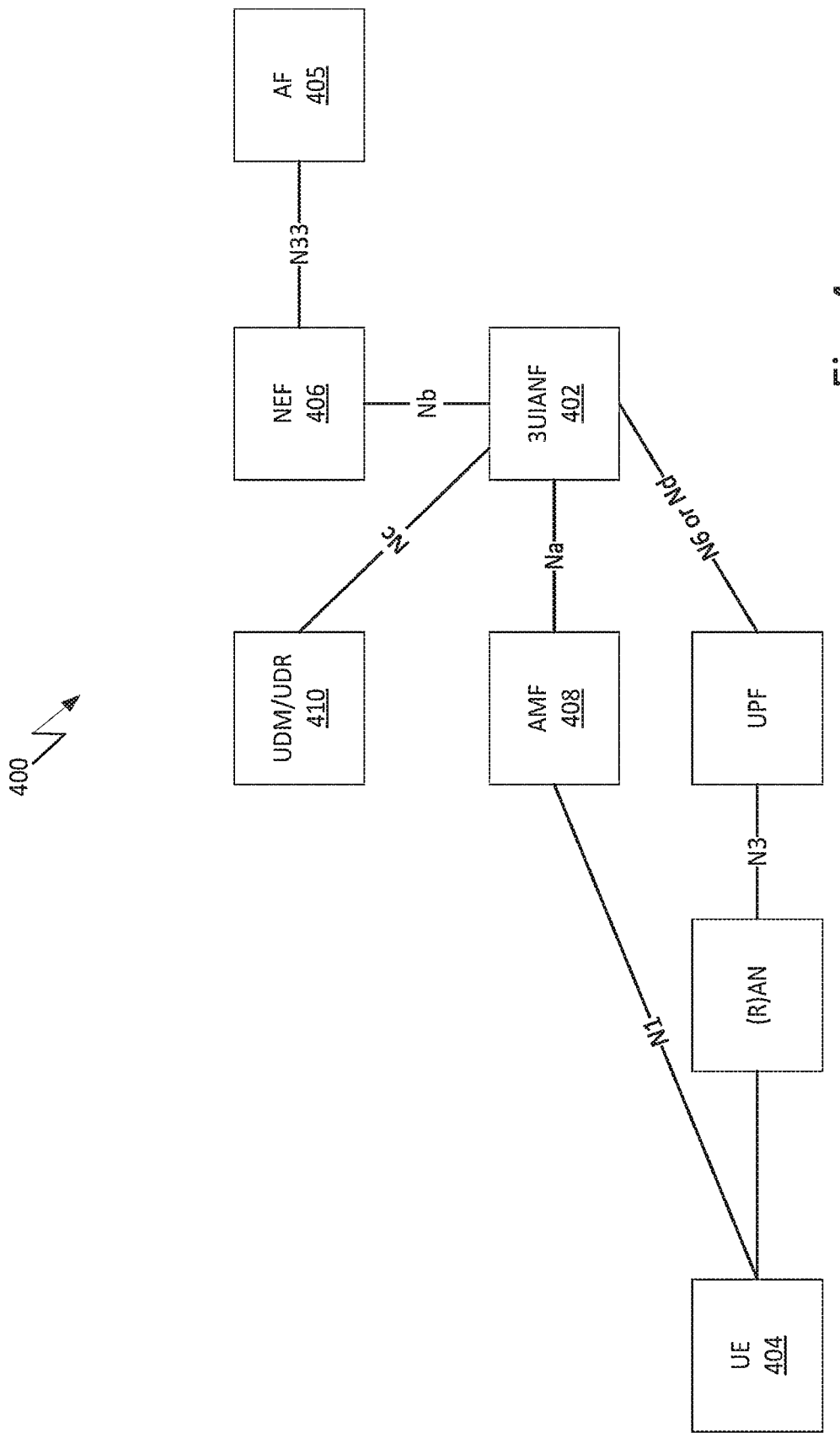
FIG. 4 is a block diagram showing a 3GPP User-Identity Authentication Network Function (3UIANF) in the 5GC, in accordance with an example embodiment.

Referring to FIG. 4, a new 3GPP User-Identity Authentication Network Function (3UIANF) 402 may be included in a 5GC 400, in accordance with an example embodiment. The 3UIANF 402 may expose a user identity authentication service that allows a requestor (e.g., another NF) to request that a user be authenticated. The 3UIANF 402 may support different styles of user identity authentication. In one example, the 3UIANF 402 supports requests to authenticate a 3GPP User-Identity that come from a UE 404 via control plane (e.g., NAS) signaling. In another example, the 3UIANF 402 supports requests to authenticate a 3GPP User-Identity that come from the UE 400 via user plane (e.g., UDP based PANA) messaging. In yet another example, the 3UIANF 402 supports requests to authenticate a 3GPP User-Identity that come from an Application Function (AF) 405. This request may come via API's that are exposed by the NEF 406 on the N33 reference point. It will be understood that the functionality of the 3UIANF 402 may alternatively be part of the Authentication Server Function (AUSF) or may be provided by one or more network functions. For example, the 3UIANF 402 may alternatively be deployed as an AF 405 and its interaction with other NF's (e.g., the AMF 408) may be routed via the NEF 406.

Upon completion of a user authentication, the User Record in the UDR 410 may be updated to indicate that the 3GPP User-Identity is authenticated. Also, if applicable, the SUPI and PEI that are associated with the device that is using the 3GPP User-Identity are recorded in the User Record in the UDR 410. Also, if applicable (e.g., if the 3GPP User-Identity is connecting via a device with a subscription), the subscriber record that is associated with the SUPI is updated to indicate that the 3GPP User-Identity is currently associated with the subscription. In some cases, the fact that the 3GPP User-Identity is currently associated with the subscription may be retrieved later by other network functions (NF's) when authorizing service requests and/or when other NF's need to determine how to reach the user for services, such as MT short message service (SMS) for example. When a user uses a UE to access the network, the network may choose to update the UE's allowed NSSAI and/or allowed LADNs. For example, in some cases, the UE might only be allowed to access slices that have parental control's enabled, or might not be allowed to access certain enterprise slices.

If the UE was not already authenticated with the 5GC before the procedure to authenticate the 3GPP User-Identity, the output of the authentication procedure may be used to derive NAS security keys. This may be the case, for example, when the UE connected with an RLOS connection.

If the UE was already authenticated with the 5GC before the procedure to authenticate the 3GPP User-Identity, the output of the authentication procedure, in an example, is not used to derive NAS security keys. This may be the case, for example, when the UE was already registered with the network and only the 3GPP User-Identity is being authenticated.

With continuing reference to FIG. 4, the Nc interface may be used by the 3UIANF 402 to obtain user records from the UDM/UDR 410. The Nb interface may be used to receive authentication requests from the NEF 406 that were initiated by the AF 405. The Na interface may be used to receive authentication requests from the AMF 408 that were initiated by a user. The Na interface may also be used to authenticate a user via control plane signaling. The N6 or Nd interface may be used to authenticate a user via user plane signaling.

In an example, the 3UIANF 402 may support authentication of the user identity via control plane signaling. This service may be similar to the UE authentication service that is offered by the AUSF and described herein, with some differences. For example, the input to the service may include the 3GPP User-Identity in addition to the SUPI. The input may include the PEI of the device that is hosting the 3GPP User-Identity. The 3UIANF 402 may retrieve the necessary User Record Information (e.g., see Table 2) from the UDR 410 and confirm that the user is accessing the network 400 from an allowed access network name, an allowed access type, an allowed location, and not from a restricted location. If the authentication procedure is being triggered by a request that was sent to the network by a device that is associated with a subscription, then the request may include a SUPI (or PEI). The 3UIANF 402 may check that the user's information indicates that the 3GPP User-Identity is associated with the SUPI, or that the subscription record that is associated with the SUPI (or PEI) indicates that it is associated with the 3GPP User-Identity.

Figure 5:
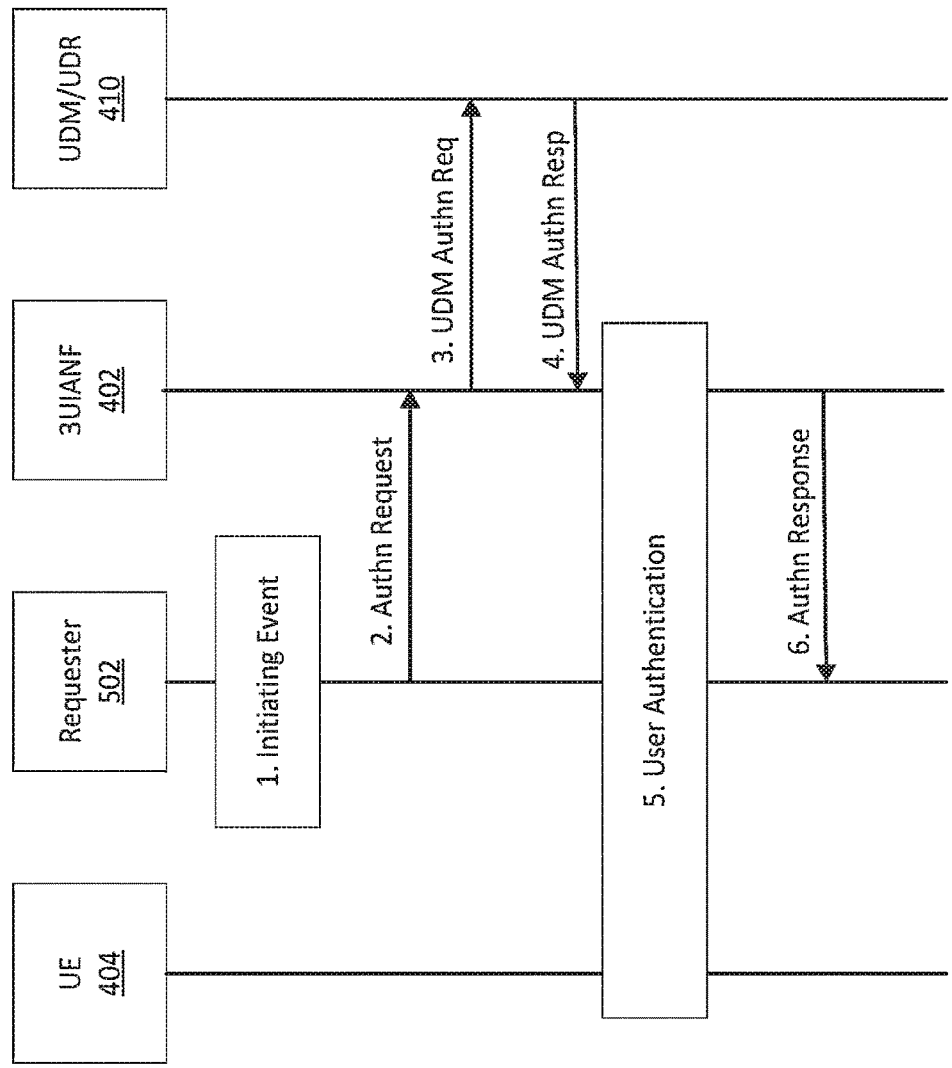
FIG. 5 is a call flow for user authentication with the 3UIANF using the control plane, in accordance with an example embodiment.
Figure 6:
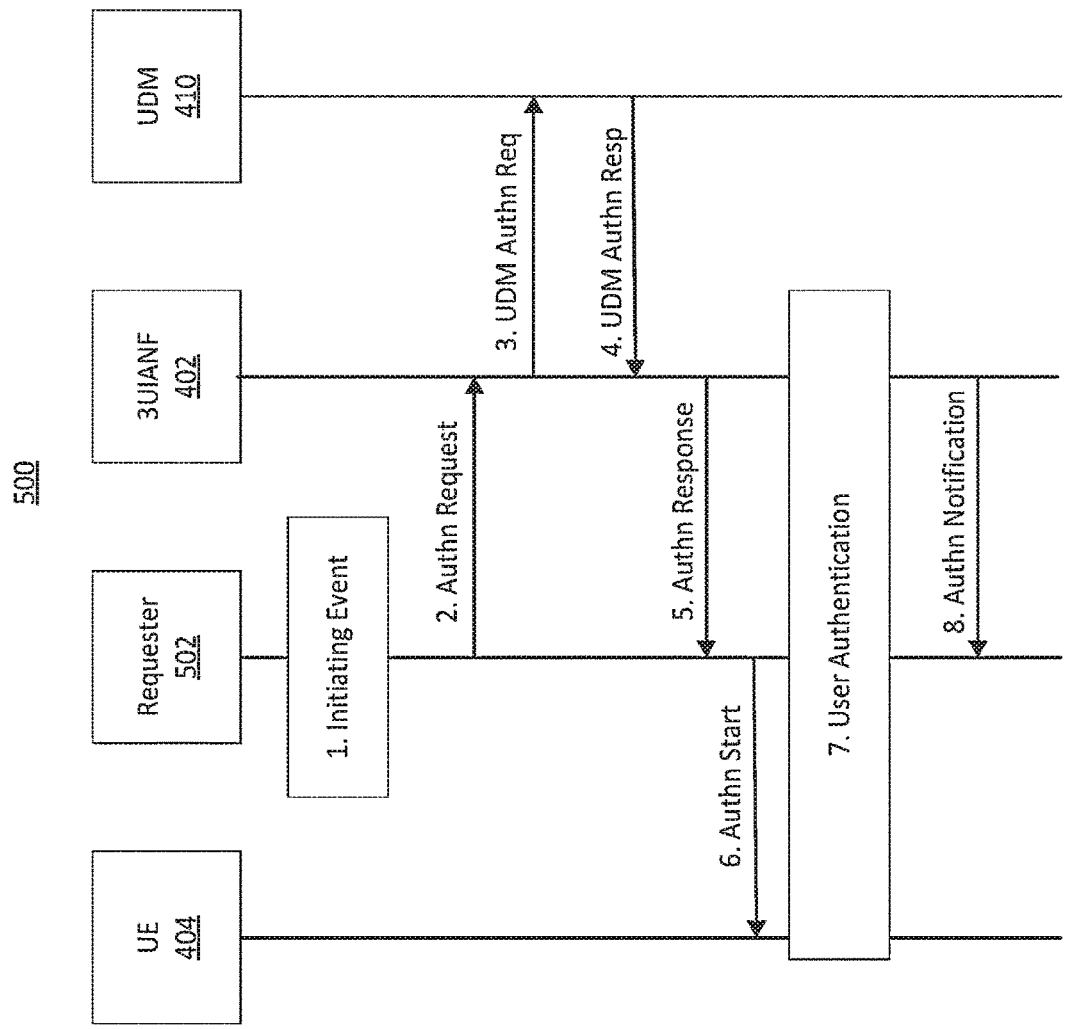
FIG. 6 is a call flow for user authentication with the 3UIANF using the user plane, in accordance with an example embodiment.

Referring also to FIG. 5, an example an example control plane based user identity authentication procedure is shown. FIGS. 5 and 6 show an example system 500 that includes the UE 404, a requester NF 502, the 3UIANF 402, and the UDM/UDR 410. It will be appreciated that the example system 500 is simplified to facilitate description of the disclosed subject matter and is not intended to limit the scope of this disclosure. Other devices, systems, and configurations may be used to implement the embodiments disclosed herein in addition to, or instead of, a system such as the system shown in FIGS. 5 and 6, and all such embodiments are contemplated as within the scope of the present disclosure. Referring in particular to FIG. 5, in accordance with the illustrated example, the 3GPP User-Identity may be associated with a device that is making an initial connection to the 5GC network. The device may be a non-3GPP device that is making an initial registration request to the network and the device has no SUPI. Instead, it makes the initial registration request with the 3GPP User-Identity.

Still referring to FIG. 5, at 1, in accordance with the illustrated example, the Requester NF 502 begins the process of authenticating a user. Examples of initiating events include, without limitation: reception of a Registration Request that includes a 3GPP User-Identity; reception of a PDU Session Establishment, Release, or Modification Request that includes a 3GPP User-Identity; Reception of a Service request that includes a 3GPP User-Identity; and Reception of an API request that includes a 3GPP User-Identity (e.g., the NEF 406 receives an API request from an AF). In an example, the Requester 502 is the AMF 408. At 2, the Requester sends an authentication request to the 3UIANF 402. The request may include the Requester ID and 3GPP User-Identity. The request may also include the SUPI and/or PEI that is associated with the UE 404 that initiated the request.

At 3, the 3UIANF 402 obtains the necessary authentication information from the UDM/UDR 410. The request to the UDM/UDR 410 may include the 3GPP User-Identity. The 3UIANF 402 may send requests to more than one UDM/UDR. For example, it may need to obtain information based on the 3GPP User-Identity from one UDM/UDR and information based on the SUPI from another UDM/UDR. For example, the 3UIANF 402 may need to check the subscription information (associated with the SUPI) to determine if the subscriber allows the user to access and the 3UIANF may need to check the user information (associated with the 3GPP User-Identity) to obtain the information necessary to authenticate the user. In some cases, the 3UIANF 402 may alternatively query a third party AF to authenticate and authorize the user. The 3UIANF 402 may determine which third party AF to query based on information that was obtained from the UDM/UDR 410. The request may be sent to the AF via an NEF. The identity may also be obtained from the UDM/UDR. At 4, the UDM(s), for instance the UDM/UDR 410, respond to the 3UIANF request(s).

Based on the authentication information that was obtained at 4, the 3UIANF 402 selects the authentication method and performs user authentication. Depending on the authentication method, the user authentication procedure may involve different round trips between the UE 404 and the 3UIANF 402. For example, if the user is a non-human device, it may have the necessary logic and security credentials to rely on a credential based authentication exchange with the core network. Alternatively, if the user is a human, then network authentication may be assumed to be implicit if the UE that it is using is authenticated, and the user authentication may be achieved by sending the user to a captive portal where the user may enter credential information. At 6, in accordance with the example, the 3UIANF 402 responds to the requester 502 with an indication of the authentication result. The 3UIANF 402 may provide security keys material used that may be used by the requester 502 to derive other security key(s).

The 3UIANF 402 may also support authentication of the user identity via user plane signaling. A user plane approach may be well suited for the case where a UE has already used its SUPI to register with network and is now authenticating the user of the UE. A user plane approach may also be well suited for the case where the UE is allowed to attach to the network without authenticating, and is able to obtain an RLOS connection. The RLOS connection can then be used to communicate with the 3UIANF 402 and authenticate the user. An RLOS connection may be established via a well-known DNN and/or S-NSSAI slice that allows the UE to obtain an IP connection to the 3UIANF.

When a user plane approach is used, the UE may send an authentication request to the AMF. The authentication request includes the 3GPP User-Identity. The AMF may invoke the 3UIANF authentication service. In this example, interaction between the 3UIANF and UE is not via NAS signaling. Rather, interaction with the UE will be via the user plane. The user plane interaction may consist of an authentication procedure that is carried in EAP signaling over PANA. In this user plane scenario, the 3UIANF 402 may be the EAP Authenticator, the User may be the EAP peer, and the Authentication Server may be the UDM 410.

Referring to FIG. 6, an example in which a user may be authenticated via user plane signaling is shown. The illustrated procedure may be initiated via control plane signaling. At 1, in accordance with the illustrated example, an initiating event causes the Requester NF 502 to begin the process of authenticating a user as described above with reference to FIG. 5 (at 1). At 2, the Requester 502 sends an authentication request to the 3UIANF 402 as described above with reference to FIG. 5 (at 2). At 3, the 3UIANF 402 obtains the necessary authentication information from the UDM/UDR 410 as described above with reference to FIG. 5 (at 3). At 4, the UDM(s) (e.g., UDM 410) responds to the 3UIANF 402 request(s) as described with reference to FIG. 5 (at 4). At 5, based on the authentication information that was obtained at 4, the 3UIANF 402 responds to the requester 502 with an IP Address and Port number that the User may contact to perform authentication. In an example, instead of an IP Address, an FQDN may be provided. This message may also indicate a preferred authentication method (e.g., EAP, AKA based, PANA, etc.).

Still referring to FIG. 6, in accordance with the illustrated example, at 6, the requester 502 forwards the information received at 5 to the user. In some cases, this request may be sent from the 3UIANF 402 to the user in a NAS message. For example, the request may be sent in a NAS notification or device trigger that includes a 3GPP User-Identifier and a trigger purpose. The trigger purpose can specify user based actions that the user should perform (e.g., refresh user login, user friend connect requests, etc.). The message may include the 3GPP User-Identity, and the IP Address and Port Number that were provided at 5. If the initiating event (at 1) was the result of a user plane request from the UE, then, in some examples, this message may be a user plane response. If the initiating event (at 1) was the result of an API request, then, in some cases, this message may be sent to the API invoker instead of the UE and step 7 may take place between the API invoker and the 3UIANF 402.

At 7, the UE 404 and 3UIANF 402 perform User Authentication. This procedure may be initiated by the UE 404 sending a PANA-Client-Initiation (PCI) message to the 3UIANF 402. In an example, the UE 404 sends the message to the IP Address and Port Number that were provided at 6. When the authentication procedure completes, security key(s) may be derived that can be used for subsequent user plane messaging that is associated with the user. The UE 404 may create a new PDU session, modify a PDU session, or send a Service Request before sending the PANA-Client-Initiation (PCI) message. If other authentication messages are used, in some cases, the message may be different than a PCI message. At 8, in accordance with the example, a notification is sent to the NF requestor 502 informing it of the completion (and success or failure) of the user authentication.

The services of the 3UIANF 402 may be exposed to third parties directly, via the NEF 406, or via some other API exposure function. This may be useful when the 3GPP User-Identity is used to access a third party service. The NEF 406 may expose API's that allow third party AF's to request that the Network Authenticate a user on the AF's behalf. For example, the NEF 406 may expose an API that allows the AF to provide a 3GPP User-Identity and request that the network authenticate the 3GPP User Identity. The request may include a reference ID that is known to the User and the AF.

The example depicted by FIG. 6 may be modified such that the initiating event is a request from the API exposure function (e.g., the NEF). In an example, the request may include the 3GPP User-Identity, AF Identifier, and reference ID. In addition, the request may include an indication of the location of the device or the UE that the 3GPP User-Identity is using to access the 5G system. Steps 2-5 of FIG. 6 may also be modified such that the 3UIANF 402 may check that the AF is authorized to communicate with the user. Steps 6 and/or 7 of FIG. 6 may be modified to include the Reference ID so that the user knows which AF initiated the authentication request, and thus can determine if it wants to be authenticated. When the API exposure function receives the completion notification at 8 (FIG. 6), the API exposure function may send a completion notification to the AF.

Thus, as described above, an apparatus (e.g., 3UIANF 402) may receive an authentication request from a requester node, and the authentication request may include an identity associated with the requester node, and a user identity associated with a user of a UE in communication with the requester node. In response to the authentication request, the apparatus may obtain information associated with the user identity. Based on the information, the apparatus may perform an authentication of the user of the user equipment, wherein the user identity is independent of a device identity associated with the user equipment, so as to allow the user a network access after the authentication. The user may be a capillary device in communication with the user equipment, such that the user identity identifies the capillary device. Alternatively, the user may be a first human, such that the user identity identifies the first human, and the device identity indicates a second human who is different than the first human. The authentication request may include at least one of a subscription permanent identifier of the user equipment or a permanent equipment identifier of the user equipment. The information associated with the user identity may be obtained from a unified data repository. For example, the information associated with the user identity may be obtained from a plurality of unified data repositories. The obtained information associated with the user identity may indicate a restriction related to the network access, the restriction associated with at least one of a location of the user, an equipment identifier of the user, an access type, a data network, a network function, one or more network slices, or a time. The obtained information may further include a preferred mechanism for the authentication, or one or more credentials for the authentication. In some examples, the obtained information associated with the user identity includes subscription information associated with a subscription of the user equipment, and the subscription information may indicate at least one of: one or more user identities associated with the subscription, one or more user identities allowed to access the network via the subscription, one or more user identities forbidden to access the network via the subscription, whether guest users are permitted to access the network via the subscription, one or more specific guest users what are allowed to access the network via the subscription.

As also described above, the user identity may indicate a mobile network operator associated with the user, the user equipment to which the user communicates, or a subscription used for the network access. The user identity may be formatted in accordance with an internal format that is different than an external format of the user identity that is used by the user equipment. In an example, the authentication request is received from the requester node responsive to the user equipment sending an initial request to the network via the requester node, and the initial request may include the user identity. Further, the initial request may be one of, for example, a registration request; a PDU Session Establishment, Release, or Modification Request; a service request; or an API request. In an example, the requester node includes an Access and Mobility Management Function. Further, performing the authentication of the user may include determining that the user equipment is authenticated, and directing the user to a captive portal so as to enable the user to enter credential information at the captive portal.

In some cases, performing the authentication of the user includes sending the requester node an IP address and a port number for the user to contact. In another example, performing the authentication of the user includes receiving a PCI message from the user, at the IP address and the port number, so as to initiate the authentication. The apparatus may also derive one or more security keys used for subsequent user plane messages associated with the user. In an example, performing the authentication of the user includes sending the requester node a message indicating a preferred authentication method for the authentication. In another example, the authentication request is received from the requester node responsive to the user equipment sending a user plane request to the network via the requester node.

Described now are example methods that may be used by a user to obtain services with a 3GPP User-Identity when using a UE to access the network. Before using one of these methods, in some cases, the UE may receive broadcast information indicating that the network supports connecting with a 3GPP user-identity. Also described herein are methods for IoT devices that have a 3GPP User-Identity associated with them (e.g., wearables and smart home devices) to connect to UEs (e.g., smart phones and gateways). The UE can then use the methods now described to allow the IoT devices to obtain network access/network services.

A device may display a GUI, for instance example GUI 1000 (see FIG. 10), that allows the device owner to enter the names of people that are allowed to use the device. The device owner may also enter a 3GPP User-Identity that is associated with each user. It will be understood that a network may recognize the 3GPP User-Identity based on some previous enrollment of the 3GPP User-Identity, for example, when the user's account was established. Furthermore, the device may allow the owner and users to configure biometric data that is associated with each user. For example, the device may be configured to recognize each user's fingerprint via a fingerprint sensor and may be configured to recognize physical features of each user via a camera. Each user may also have an alpha numeric password configured locally on the device. The user may enter or speak the alpha numeric password in order to identify himself/herself when they unlock or begin to use the device. These techniques may be considered as unlocking the device.

When a new user unlocks the device, the following actions by the UE may be triggered, presented by way of example and without limitation: a General Registration Procedure; PDU Session Establishment, Modification, and/or Release Procedures; and a Service Request. During these procedures, each NF may record the user identity in CDR's so that the subscribers and users can be appropriately charged when the CDR's are processed in the billing domain. When a new user uses a UE to access the 5G network, the PCF may send new polices to the UE to indicate how traffic from the user should be treated.

Figure 7:
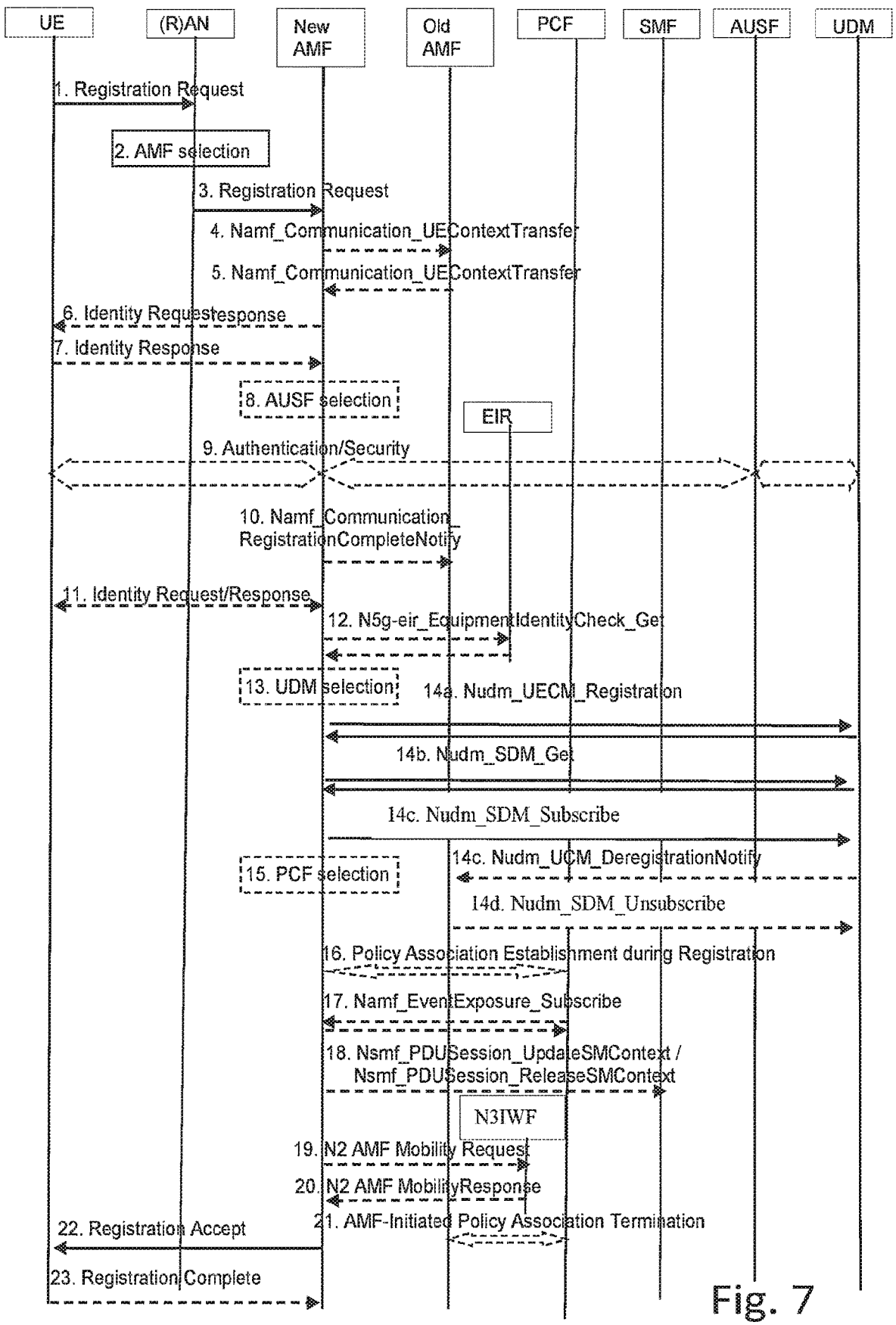
FIG. 7 is a call flow showing an example registration procedure that be modified in accordance with an example embodiment.

Referring now to FIG. 7, there are various scenarios in which a given UE may trigger a Registration Request. For example, the application level activity that triggers a registration may be when a user unlocks the UE, starts a particular application, or logs into a particular application. The user may be the same or a different user than the last user who unlocked the UE, used the application, or logged into the application. FIG. 7 shows a general registration procedure. Modifications to the general procedure, in accordance with various embodiments, are now discussed, with reference to FIG. 7.

At 1, the UE sends a Registration Procedure to the AMF. The Registration Procedure may be caused, or triggered, when the user unlocks the device. The Registration Procedure includes various parameters, such as: Registration type, SUCI or 5G-GUTI or PEI, Security parameters, Requested NSSAI, [Mapping Of Requested NSSAI], UE 5GC Capability, PDU Session status, List Of PDU Sessions to be activated, Follow on request, MICO mode preference, Requested DRX parameters. In accordance with an example embodiment, the 3GPP User-Identity, an indication that the UE supports the User-identity feature (and which also may indicate that the User-Identity will be provided), and/or a parameter indicating the list of allowed users may be added to the message at 1 as optional fields. The 3GPP User-Identity in this example refers to the user identity of the user that unlocked the device. If the identity is not present, the network may fall back to default behavior and assume that the device user is the subscriber that is associated with the UE. Alternatively, this may be a list of users that are currently associated with the device. For example, the device may be a wall mount monitor and multiple users may be in the room with the monitor. With respect to the list of allowed users, if the Registration is triggered in response to the paging, the Registration Request message may identify the list of Users that are currently associated with the device.

The Registration Type field allows the UE to indicate if the UE wants to perform an Initial Registration, Mobility Registration, Emergency Registration, or a Periodic Registration Update. In an example, the Registration Type field is updated or a new field is added to allow the UE to indicate if the purpose of the registration is to add a new user association, remove a user association, or switch user associations. If the Registration Type field supports this indication, it may be enhanced such that it can be a bit field that allows the UE to indicate multiple registration causes. Example registration causes include Emergency and New User, which may occur when a user unlocks the UE for an emergency phone call. The List of PDU Sessions to be activated may be determined, at least in part, by the UE based on which user unlocked the UE. The Requested NSSAI may be determined, at least in part, by the UE based on which user unlocked the phone. For example, polices in the UE may dictate that certain users may only connect to slices that offer parental control services, or that only certain users are permitted to connect to a particular enterprise slice.

If multiple users are simultaneously using the device, the registration request may include multiple 3GPP User-Identities and multiple Requested NSSAI's, wherein each Requested NSSAI may be associated with a 3GPP User-Identity. Alternatively, the UE may provide a single NSSAI that is an aggregate of the NSSAI's that are associated with the 3GPP User-Identities in the request.

In some cases, the encoding of the PDU Session status is enhanced to allow the UE to indicate the PDU Session status of users other than the user(s) that are associated with this registration request. For example, the UE may indicate to the network that PDU sessions that are associated with other users should be released or maintained. Thus, in some cases, this field is enhanced to indicate that a PDU session is suspended, paused, or deleted.

The registration request at 1 may include an indication that the request is for RLOS network services and authentication with a 3GPP user-identity. The registration request may include a PEI to identify the UE. In some examples, the PEI may be something other than an IMEI, such as a MAC Address for example.

The indication that the request is for RLOS network services and authentication with a 3GPP user-identity may be part of the NSSAI that is provided by the UE to the network in the registration request. For example, the NSSAI name may indicate that the UE wishes to obtain access to a service that can be used to authenticate the device's 3GPP user-identity.

In some examples, separate lists of PDU Session Identifiers for each User on a UE are maintained. The format of the PDU Session Identifier may be enhanced, in some cases, to be a concatenation of a 3GPP-User Identifier and numerical value that indicates the PDU Session, thus making the PDU Session Identifier a unique value per UE per user.

When the registration request is sent, the request may include user PDU session identifiers that were last used on different UE's. The request may further indicate which UE (e.g., PEI) or subscription (e.g., IMSI, GUTI, or External Identifier) was last used to establish the PDU with the network. Alternatively, when a user establishes a PDU session, the network may provide the UE and user with a PDU session reference ID so that the user can use the reference ID to re-establish the connection when it reconnects from the same or a different device. The PDU Session Establishment, Registration, or Service Request may indicate that this type of PDU Session, which supports a reference ID, is desired.

Still referring to FIG. 7, at 9, the user identity(s) that were provided at 1 may be authenticated as described above. Alternatively, if the UE has not already been authenticated, a 2-step authentication may be performed, in accordance with an example. In an example, the UE is authenticated, and if the UE authentication is successful, the user is subsequently authenticated. If the UE is not authenticated, the UE and user may be informed with a registration reject message that indicates the reason for the rejection of the authentication.

At 12, the N5g-eir_EquipmentIdentityCheck_Get Identity Request service may be enhanced so that when the AMF checks the PEI, it may also indicate the 3GPP User-Identity(s) that are attempting to use the device that is associated with the PEI. The response from the EIR may be an indication of whether or not each user is permitted to use the device that is associated with the PEI.

As an alternative to checking access authorization as part of the authentication at 9, the authorization may also be verified independently. The AMF may check that the user is accessing a UE using an Associated Access Type. The AMF may also check that the UE is on the Associated SUPI(s) (or Associated PEI(s) list), and in an Associated Location(s).

At 13, the AMF, based on the SUPI, selects a UDM. The UDM may select a UDR instance. In some examples, the AMF selects additional UDM's. A UDM may need to be selected per each 3GPP User-Identity. The UDM discovery function may accept the 3GPP User-Identity, or fields within the 3GPP User-Identity, as an input to be used in determining the UDM. At 14, the AMF registers with the UDM using the Nudm_UECM_Registration service. In an example, this service allows the AMF to indicate which users are associated with the registration. Furthermore, the AMF may contact other UDM's to inform them that a user is using a UE that is reachable via the AMF. When the AMF contacts UDM's that are in different PLMN's, in some cases, it does not inform the UDM about users that are not associated with the different PLMN. Informing the UDM about a user may be performed with an updated Nudm_UECM_Registration service or a new service. At 14, the AMF may also need to contact UDM(s) to inform them that a user(s) is no longer reachable on the UE via the AMF. This may be performed with an update Nudm_UECM_DeregistrationNotification service or a new service.

In some cases, network policies may dictate whether or not the UDM/UDR should indicate to the AMF if the user is already connected via a different subscription, or device, and whether to allow or disallow the user's connection when this situation occurs.

Still referring to FIG. 7, at 15, the AMF may select a PCF. Currently, the PCF is selected based on the UE or PDU Session. In accordance with an example embodiment, the PCF may also be selected based on the 3GPP User-Identity. When the AMF utilizes the NRF to discover a PCF, it may provide the NRF with the 3GPP User-Identity that may be used to determine where policies that are associated with the user may be stored.

At 16, the AMF gets polices from the PCF by invoking the Npcf_AMPolicyControl Get service. The service may be updated to allow the AMF to indicate a 3GPP User-Identity, instead of, or in addition to, the SUPI, when the service is invoked. Also, the PEI may be provided to the PCF. The PEI may indicate which policies should be applied when the device that is associated with the user has no SUPI. At 17, the AMF invokes the Namf_EventExposure_Subscribe service to subscribe to notifications about the changes to policies that are associated with the UE. In an example, the AMF can provide a 3GPP User-Identity in order to subscribe to notifications about the policy changes related to the user. At 18, the AMF invokes the Nsmf_PDUSession_UpdateSMContext service with SMF(s) to activate the PDU sessions in the "List Of PDU Sessions To Be Activated". The service is enhanced, in accordance with an example, to allow the AMF to indicate the 3GPP User-Identity instead of, or in addition to, the SUPI. The AMF may also invoke the Nsmf_PDUSession_UpdateSMContext service with SMF(s) to pause, or suspend, PDU sessions that are not associated with the user that is currently using the UE. Alternatively, in an example, a new service is created for suspending or pausing a PDU session.

Still referring to FIG. 7, at 22, the AMF responds to the UE with a Registration Accept message. The response indicates whether each PDU Session is rejected. If the rejection is because the user is not allowed to access the network from the UE, or because there are already too many users connected to the network from the UE, then the message indicates this to the UE in the cause value. If the registration is not allowed because some of the indicated 3GPP User-Identity(s) are not allowed to access the network, because some of the users are not allowed to access the network from the UE, because there are already too many users connected to the network from the UE, and/or the users are not allowed to access the network with the subscription that is associated with the device, then these causes are indicated to the UE.

Figure 8:
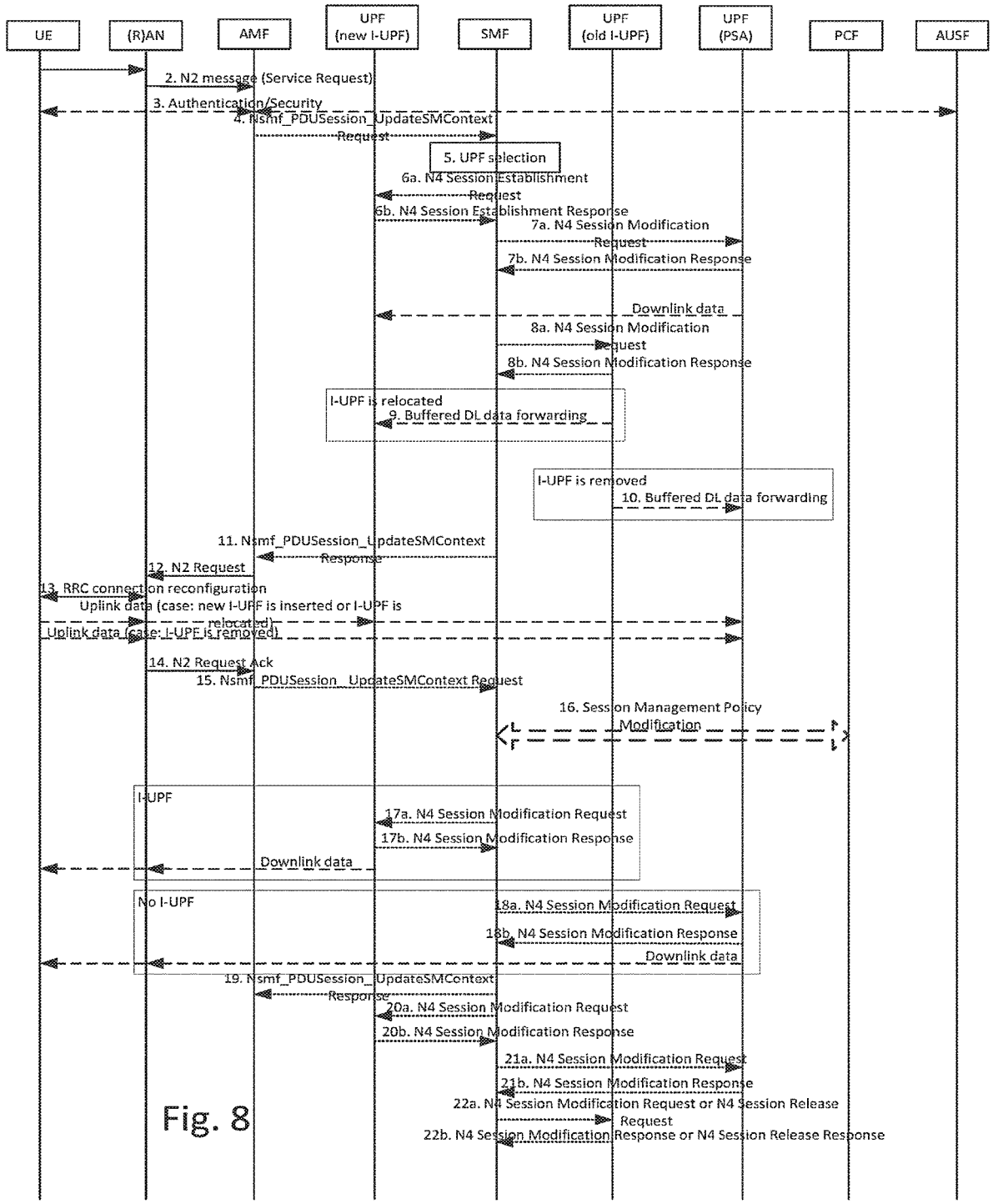
FIG. 8 is a call flow showing a UE-triggered service request procedure that can be modified in accordance with an example embodiment.

Referring now to FIG. 8, there are various scenarios where the UE might trigger a Service Request. For example, the application level activity that triggers a service request may be when a user unlocks the UE. The user may be the same or a different user than the last user to have unlocked the UE. A Service Request may be triggered by a NAS notification message. The NAS notification message may be enhanced to include a 3GPP User-Identity. By receiving the 3GPP User-Identity, the UE may know which user is associated with the PDU session(s) that need to be established in the subsequent service request. FIG. 8 shows a general UE-triggered service request procedure. Modifications to the general procedure, in accordance with various embodiments, are now discussed, with reference to FIG. 8.

At, the UE sends an N2 Service Request to the AMF. The service request may be caused, or triggered, when the user unlocks the device. The Service Request may include the following parameters: List Of PDU Sessions To Be Activated, List Of Allowed PDU Sessions, security parameters, PDU Session status. The service request may also include, by way of example and without limitation, the 3GPP User-Identity, list of allowed users, a user flag, and list of PDU sessions to be activated. The 3GPP User-Identity refers to the user identity of the user that unlocked the device. If it is not present, in an example, the network may fall back to default behavior and assume that the device user is the subscriber that this associated with the UE. Alternatively, in another example, this may be a list of users that are currently associated with the device. For example, the device may be a wall mount monitor and multiple users may be in the room with the monitor. With respect to the List of Allowed Users, if the Service Request is triggered in response to paging, the Service Request message may identify the list of Users that are currently associated with the device. In an example, the purpose of the service request is to add a new user association, remove a user association, or switch user associations. When the flag indicates that the UE desires to switch users, the flag may be interpreted as an indication that PDU sessions that are associated with other users should be terminated. The UE may provide a list of List Of PDU Sessions To Be Activated per allowed user. This may be useful, for example, when the Service Request is in response to a page. The network may have paged the UE because it knows that the user that it needs to contact was recently associated with the UE. However, the user may, or may not, still be associated with the UE at the time of paging, or multiple users may be associated with the UE (e.g., in the smart TV example that was discussed earlier, in the case of a smart home control panel, etc.).

At 3, a request may trigger a procedure wherein the user identity needs to be authenticated. When this is the case, the user identity may be authenticated using procedures described herein. At 4, the AMF determines which SMF(s) are associated with the PDU Session(s) to be activated, and invokes the Nsmf_PDUSession_UpdateSMContext Request service with each SMF with the Operation Type set to "UP activate". This message may include the following parameters: PDU Session ID(s), Operation Type, UE location information, Access Type. In various examples, this message may also include, by way of example and without limitation:

3GPP User-Identity: This is the user identity that was indicated by the UE.

List of Allowed Users: This is the List of Allowed Users that was indicated by the UE.

User Flag: This is the User Flag that was indicated by the UE.

If provided by the UE, the AMF may provide a list of List Of PDU Sessions To Be Activated per allowed user.

The AMF may determine to release some PDU sessions. For example, if the UE indicated that the request is a request to switch the user that is associated with the UE, the AMF may decide to release PDU sessions that are associated with other users. Similarly, if the request indicates that the request is to remove a user, the AMF may decide to release PDU sessions that are associated with the removed user. The AMF determines which SMF(s) are associated with the PDU Session(s) to be released and invokes the Nsmf_PDUSession_UpdateSMContext Request service with each SMF with the Operation Type set to "UP deactivate". This message already includes the following parameters: PDU Session ID(s), Operation Type, UE location information, Access Type. In various examples, the message may also include a cause value indicating that the session is being deactivated because the user is no longer associated with the UE.

If the message from the UE was triggered in response to a page, and the user for which the UE was paged is not in the List Of Allowed Users provided by the UE and/or the PDU session for which the UE was paged is not in the List Of Allowed PDU Sessions, the AMF notifies the SMF that the User Plane for the PDU Session cannot be re-activated. The notification to the SMF may include an indication that the user is no longer associated with the UE. If the AMF is aware of what UE the user is associated with, the AMF may provide this information to the SMF so that the SMF may attempt to page the user at the other UE.

In some examples, separate lists of PDU Session Identifiers for each User on a UE are maintained. In another example, the format of the PDU Session Identifier may optionally be updated to be a concatenation of a 3GPP-User Identifier and a numerical value that indicates the PDU Session, thus making the PDU Session Identifier a unique value per UE per user. If the user is making a service request from the UE and the user is not yet associated with the UE, then the AMF may update the user's record and/or the subscriber's record to record the fact that the user is reachable at the UE.

Still referring to FIG. 8, at 11, the SMF responds to the AMF. The response may include the following parameters: PDU Session ID, QFI(s), QoS profile(s), CN N3 Tunnel Info, S-NSSAI, User Plane Security Enforcement, and a Cause. Based on local polices or subscriber or user polices that were obtained from the PCF, the SMF may indicate whether PDU Sessions that are not associated with the user should be deactivated or not. At 13, the AMF responds to the UE (through the RAN). If the response indicates that the PDU Session is rejected and if the rejection is because the user is not allowed to access the network from the UE, or because there are already too many users connected to the network from the UE, then the message may indicate this to the UE in the cause value.

Figure 9:
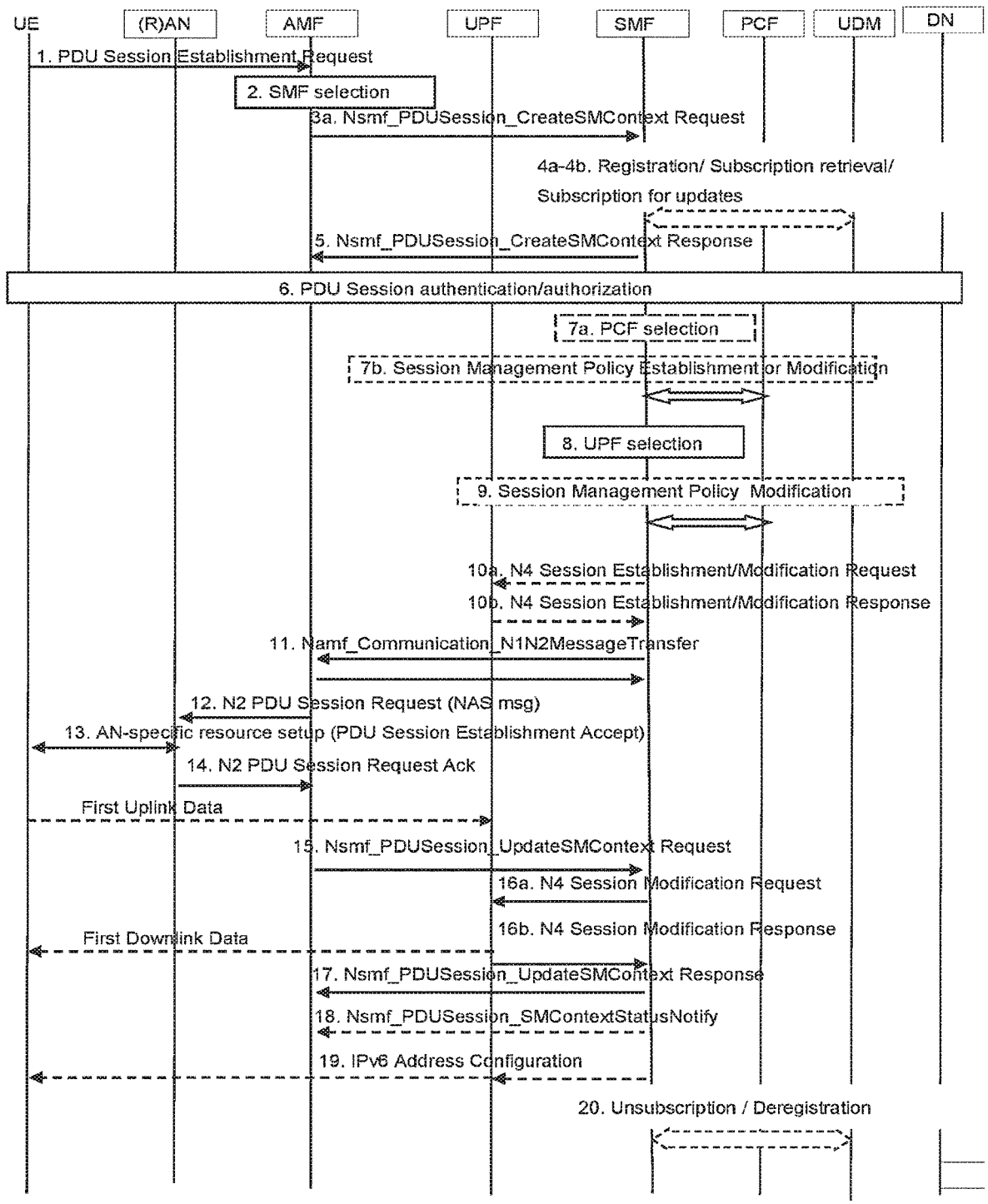
FIG. 9 is a call flow showing a UE-requested PDU session establishment procedure for non-roaming and roaming with local breakout, which can be modified in accordance with an example embodiment.

Referring now to FIG. 9, there are various describes in which the UE might trigger a PDU Session Establishment Request. For example, the application level activity that triggers a service request may be when a user unlocks the UE, starts a particular application, or logs into a particular application. The user may be the same or a different user than the last user to have unlocked the UE, used the application, or logged into the application. FIG. 9 shows a general UE Requested PDU session establishment procedure. Modifications to the general procedure, in accordance with various embodiments in which different users may use the same UE, are now discussed, with reference to FIG. 9.

At 1, the UE sends a PDU Session Establishment Request to the AMF. The request may be caused, or triggered, when the user unlocks the device. The PDU Session Establishment Request may include the following parameters: S-NSSAI(s), DNN, PDU Session ID, Request type, Old PDU Session ID, N1 SM container (PDU Session Establishment Request). The message may also include the 3GPP User-Identity, which is the user identity of the user whose application layer activity triggered the request. If it is not present, in an example, the network may fall back to default behavior and assume that the device user is the subscriber that this associated with the UE. Alternatively, in another example, the PDU Session ID or S-NSSAI may include the 3GPP User-Identity or be associated with the 3GPP User-Identity, thus providing the PDU Session ID identifies which user with which the session is associated. The request may trigger a procedure where the user identity needs to be authenticated. When this is the case, the user identity may be authenticated using the examples described herein.

At 2, the AMF selects an SMF. When the AMF utilizes the NRF to discover an SMF, it may provide the NRF with 3GPP User-Identity that may be used to determine where policies that are associated with the user may be stored. At 3, the AMF invokes the Nsmf_PDUSession_CreateSMContext or Nsmf_PDUSession_UpdateSMContext service. These services may be updated with the same updates that were described for the Nsmf_PDUSession_UpdateSMContext service above. At 4, the SMF registers itself as a serving node associated with the UE. In an example, the Nudm_UECM_Registration service is updated so that the SMF can also provide the 3GPP User-Identity that is associated with the PDU session. In some cases, the SMF may need to inform at least two different UDMs that it is serving the PDU session. For example, the SMF may need to inform one UDM that is associated with the UE subscription and one UDM that is associated with the user. At 7, the SMF performs PCF selection, which may be modified in accordance with step 15 described with reference to FIG. 7. At 8, the SMF performs UPF selections. When the SMF utilizes the NRF to determine an UPF, it may provide the NRF with the 3GPP User-Identity that may be used to determine where policies that are associated with the user may be stored. At 13, the AMF responds to the UE (through the RAN). If the response indicates that the PDU Session is rejected, and if the rejection is because the user is not allowed to access the network from the UE, or because there are already too many users connected to the network from the UE, then the message may indicate this to the UE in the cause value.

As discussed above, a non-3GPP device with no subscription credentials may connect to a UE in order to access the 5G network. By way of example, the device may be a smart watch, tablet, health monitoring device, door lock, smart appliance, etc. The UE may be a smart phone, smart home control panel, gateway, etc. The connection between the device and UE may be made using protocols such as Wi-Fi, PC5, Bluetooth, etc.

The device may use its connection with the UE to send a connection and authentication request to the UE. The connection and authentication request is a request to connect to the UE so that the UE can act as a relay between the 5G Network and device. The connection and authentication request includes the 3GPP User-Identity that is associated with the device. The request may also include a description of what network services the device wants to access (e.g., an NSSAI or a value that will be mapped to an NSSAI by the UE). The request may also include a device identifier that is associated with the device (e.g. a MAC address).

Figure 10:
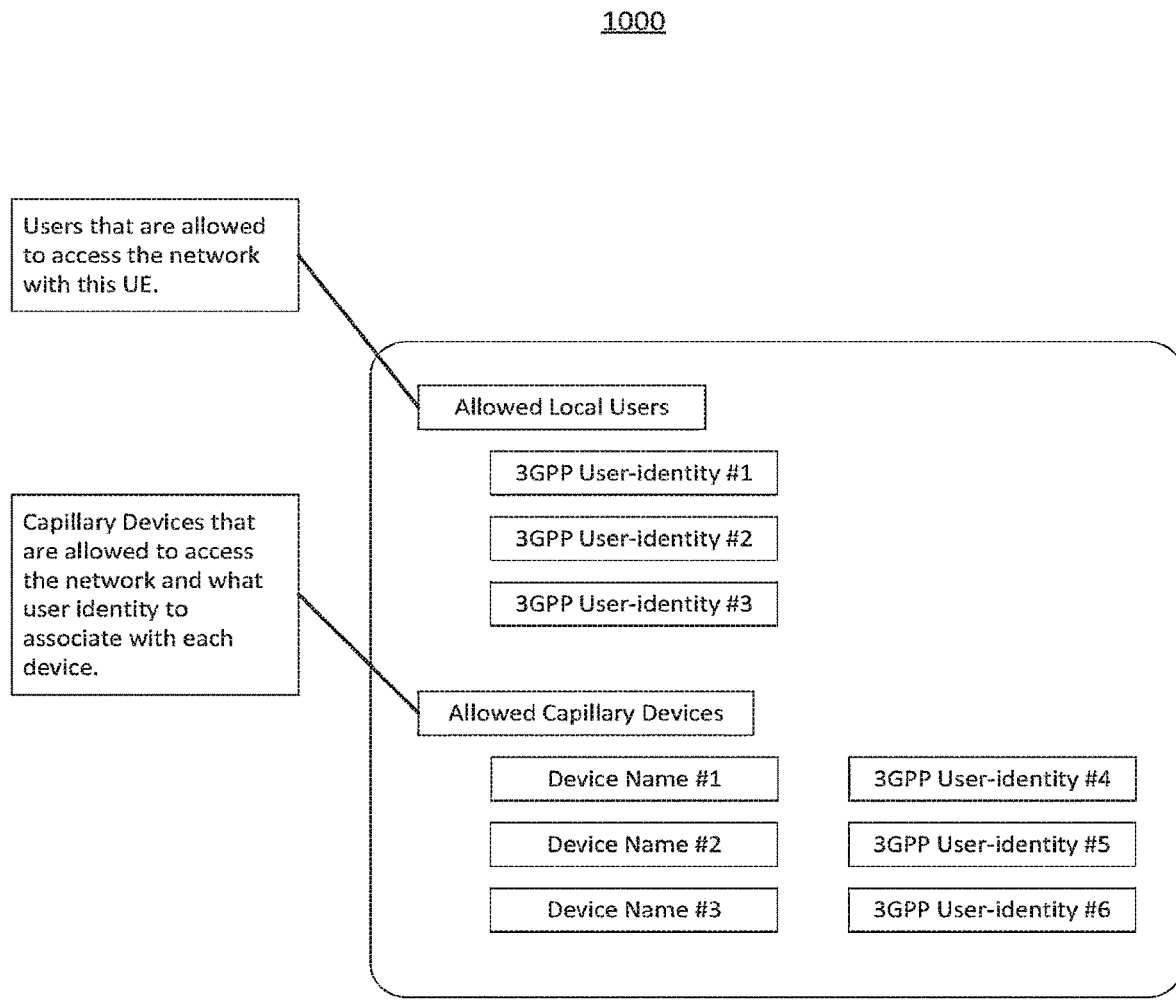
FIG. 10 is an example UE graphical user interface for configuring 3GPP user identities, in accordance with an example embodiment.

If the device does not provide the 3GPP User-Identity to the UE, the UE may provide the GUI 1000 (FIG. 10) that allows a person to enter the 3GPP User-Identity that is associated with the device. For example, when the device pairs with the UE (e.g. Bluetooth pairing) a person may be able to enter a 3GPP User-identity that is associated with the UE. Thus, the UE will then know the association of the 3GPP User-Identity with the device and the device's associated device identifiers (e.g., MAC address). The user interface 1000 can display example user identity information as shown in FIG. 10, though it will be understood that any number of GUIs, and any GUI design, may be implemented as desired. It will be understood that the illustrated example of user identity information is not exhaustive, alternative or additional information may be display or configured as desired. It will be further understood that the GUIs can provide a user with various information in which the user is interested via a variety of charts or alternative visual depictions.

Alternatively, the UE may ask a third party server for the 3GPP User Identity list, based on the MAC address of the device. For example, after the connection and authentication request, the UE may issue a request to the 3rd party server (such as 5G-EIR) to find the assigned 3GPP User Identity configured for this device.

Once a connection is made between the device and the UE, the UE may trigger one of the enhanced registration, service request, or PDU session establishment procedures described above with reference to FIGS. 7-9, respectively. Example embodiments described above may be used by the UE to authenticate the UE. In an alternative example, a deep packet inspection (DPI) based approach may be used by the 5GC to detect which flows to/from the UE are associated with the subscriber or each user(s). For example, the AMF or SMF may inform the UPF which subscriber and user(s) are associated with a UE. The UPF may then use DPI functionality to analyze traffic from the UE and determine which flows are associated with each user. For example, the UPF may obtain DPI rules that are associated with each user. The DPI rules may describe which applications each user will run, which application identifiers each user may use, what time of day each user may use particular applications, and how each user will digitally sign traffic. The DPI rules may also include biometric data that is associated with each user, for example the biometric data may be as described above. The UE may then attach the biometric data to traffic from the user and the UPF can use the DPI to detect the biometric data and determine that the traffic is from the user.

In an example, the network may need to send MT Data to a user. For example, an SMS may be addressed to a 3GPP User-Identity. In a first example use case, the user was last known to be reachable via a UE, and the UE has a subscription, e.g. an SUPI (e.g. IMSI) associated with it. In a second example use case, the user was last known to be reachable via a device, and the device had no subscription, e.g. no SUPI (e.g. IMSI) associated with it.

When a user needs to be paged in the first case, the network may know which UE to page by executing a new procedure with the UDM/UDR that allows the network to check the user's record and determine what UE the user was last associated with. The network may use existing procedures to page the UE based on the UE's IMSI, however, the paging message may be enhanced to include the 3GPP User-Identity described herein. Presence of the 3GPP User-Identity may indicate to the UE which user the page is associated with. If the UE is connected via a non-3GPP network, the network may send the device a NAS notification that includes the 3GPP User Identity (instead of paging the device). If the user is no longer associated with the UE (e.g., no longer logged in or no longer detected), the UE may respond with a service request or a Registration request that indicates that the user is no longer associated with the UE. If the user is present, the UE may send a service request message to the AMF. The UE may know to only include the PDU Session status of PDU sessions that are associated with the paged user.

When a user needs to be paged in the second example use case, the network may know how to page by executing a new procedure with the UDM/UDR that allows the network to check the user's record and determine which UE the user was last associated with. The network (AMF or SMSF) may then initiate a procedure where the user is paged with the 3GPP User-Identity. The device may use the 3GPP User-Identity to determine a paging occasion. For example, all or part of the user-name field of the 3GPP User-Identity that is described herein may be used by the UE and network to determine paging occasions. The UE may have indicated that it supports being paged by the user-identity in a previous registration message. The registration message response from the network or a broadcasted indication (e.g., in a SIB) may have indicated to the UE that the network supports paging based on the 3GPP user-identity. When the UE sees that its paging indicator is set, it may read the paging message and determine that its 3GPP user-identity is in the paging message. In an example, if the device is connected via a non-3GPP network, the network may send the device a NAS notification that includes the 3GPP User Identity (instead of paging the device). The UE may then perform a service request and provide its 3GPP user-identity to the network.

In order to avoid unnecessary pages, a UE may perform a registration update to inform the network that a user is no longer associated (e.g., logged on) with the device or UE. The device or UE may indicate to the network that the user is no longer associated with the device, or UE, by excluding the 3GPP User-Identity from the registration message. When the network receives a notification that the user is no longer associated with the device, or UE, the AMF may update the user's record in the UDR to indicate that the user is no longer associated with the device.

In an example, a UE, or modem platform, may expose an API that allows an Application to start an application flow or send data on an existing application flow. This type of API may allow the application to specify a port number that it wants to send traffic on and specify a transport level protocol for flow (i.e. UDP or TCP). The API may be enhanced, in accordance with an example embodiment, to include a 3GPP User-Identity, NSSAI (or S-NSSAI), and/or DNN. The application can specify its associated 3GPP User-identity, which slice it wants to connect to, and which Data Network. It may be configured in the application via a GUI. The Application may provide it to the UE when it makes an API call to create the traffic flow, or each time it sends traffic on the traffic flow. When the UE receives a request to initiate a traffic flow, it may trigger the UE to send a NAS request, such as a registration, service request message, or PDU session establishment request, to the network. The enhanced registration, PDU session establishment, and service request messages are described above with reference to FIGS. 7-9, which include authenticating and authorizing the user.

Thus, as described above, a UE may receive a user identity, and in response to a triggering event, send a request message to the network. The request message may include user identity and session information that is to be associated with the user identity. The request message may further include a General Registration Request, a Service Request, a PDU Session Establishment Request, a PDU Modification Request, or a PDU Session Release Request. The request message may also include a list of users that are permitted to access the network via the UE. The UE may receive a response from the network, and the response may include an indication of whether the session information is allowed to be associated with the user identity. The user identity may be received via a graphic user interface of the UE or from a capillary device that is in communication with the UE, or from an application that is running on the UE. Thus, the user identity may identify a human user of the UE, a capillary device in communication with the UE, or an application. In some examples, the triggering event is the user identity being received by the UE. Other example triggering events include when the UE transitions from a locked state to an unlocked state; when data is received, by the UE, from a capillary device in communication with the UE; or a paging message or a non-access stratum (NAS) message being received by the UE. Such a paging message may include the user identity. For example, the UE may send a second message to the network that indicates that the UE supports receiving paging notifications or NAS notifications that include the user identity. Further, the UE may receive broadcast information indicating that the network supports paging based on the user identity, and the UE can send the request message to the network based on receiving the broadcast information. Using the user identity, the UE may perform an authentication with the network of a user associated with the user identity. In an example, the session information is Protocol Data Unit (PDU) session information. In another example, the UE sends a second request message to the network to inform the network that the user identity is no longer associated with the UE. Such a second request message may be a registration request, or may be sent in response to a paging notification or NAS notification.

FIGS. 4-10 and the description related thereto illustrate various embodiments of methods and apparatuses for authorizing a user (person or device) connected to a UE. In these figures, various steps or operations are shown being performed by one or more nodes, devices, functions, or networks. It is understood that the nodes, devices, functions, or networks illustrated in these figures may represent logical entities in a communication network and may be implemented in the form of software (e.g., computer-executable instructions) stored in a memory of, and executing on a processor of, a node of such network, which may comprise one of the general architectures illustrated in FIG. 11A, 11C-E, or 11G described below. That is, the methods illustrated in FIGS. 5-9 may be implemented in the form of software (e.g., computer-executable instructions) stored in a memory of a network node or apparatus, such as for example the node or computer system illustrated in FIG. 11B or 11F, which computer executable instructions, when executed by a processor of the node, perform the steps illustrated in the figures. It is also understood that any transmitting and receiving steps illustrated in these figures may be performed by communication circuitry (e.g., circuitry 120 or 97 of FIGS. 11B and 11F, respectively, of the node under control of the processor of the node and the computer-executable instructions (e.g., software) that it executes. Any of the client, proxy, or server devices illustrated in any of FIG. 1-10 may comprise a node of a communication system, such as the ones illustrated in FIG. 11A, 11C-E, or 11G.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 11A:
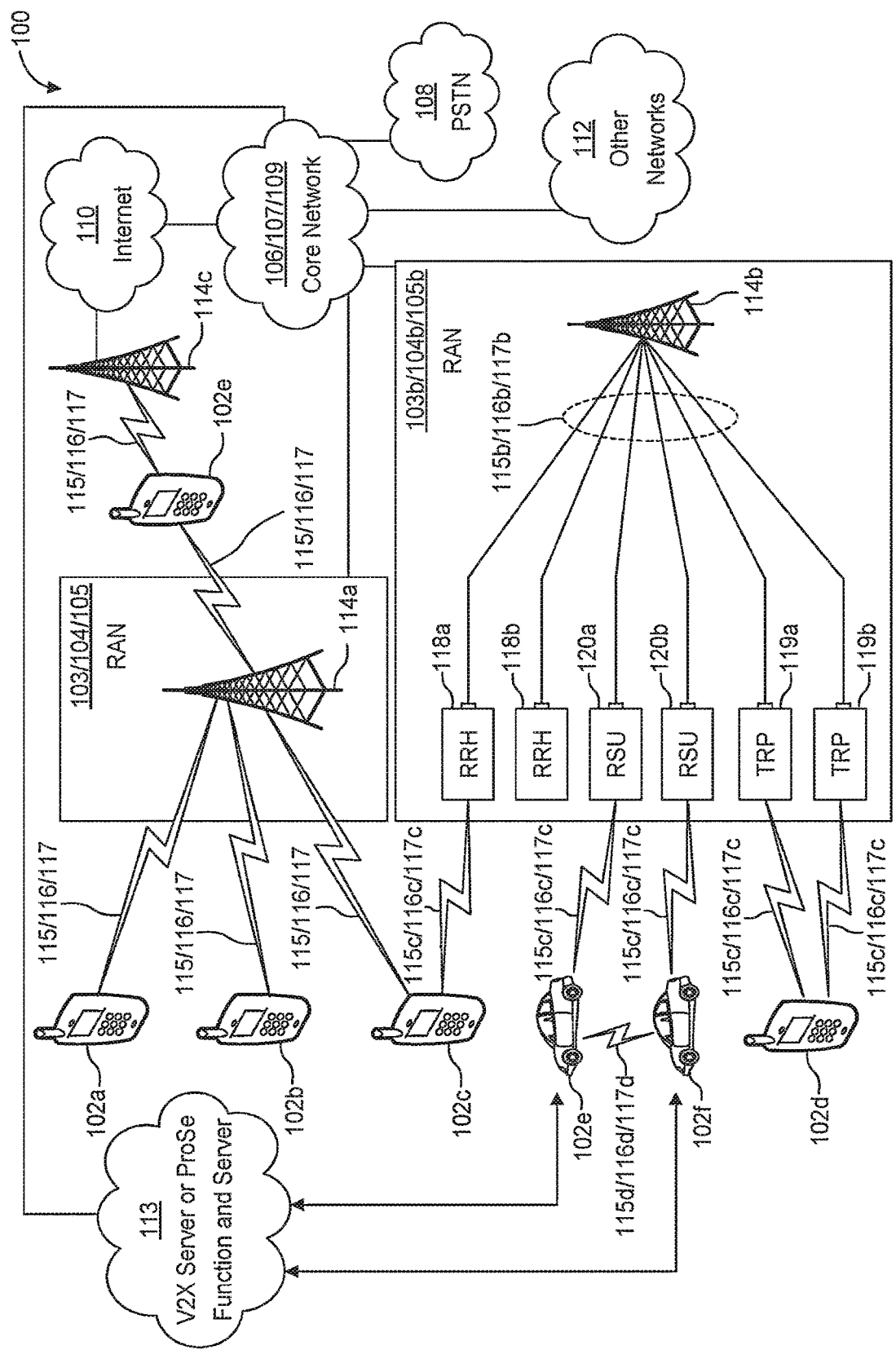
FIG. 11A illustrates one embodiment of an example communications system in which the methods and apparatuses described and claimed herein may be embodied.

FIG. 11A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, and/or 102f (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f may be any type of apparatus or device configured to operate and/or communicate in a wireless environment. Although each WTRU 102a, 102b, 102c, 102d, 102e, 102f is depicted in FIGS. 11A-11E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a, 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a, 120b, may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, and/or 102f may communicate with one another over an air interface 115d/116d/117d, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114a in the RAN 103/104/105 and the WTRUs 102a, 102b, 102c, or RRHs 118a, 118b, TRPs 119a, 119b and/or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 11A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 11A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 11A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 11A may be configured to communicate with the base station 114a, which may employ a cellular-based radio technology, and with the base station 114c, which may employ an IEEE 802 radio technology.

Figure 11B:
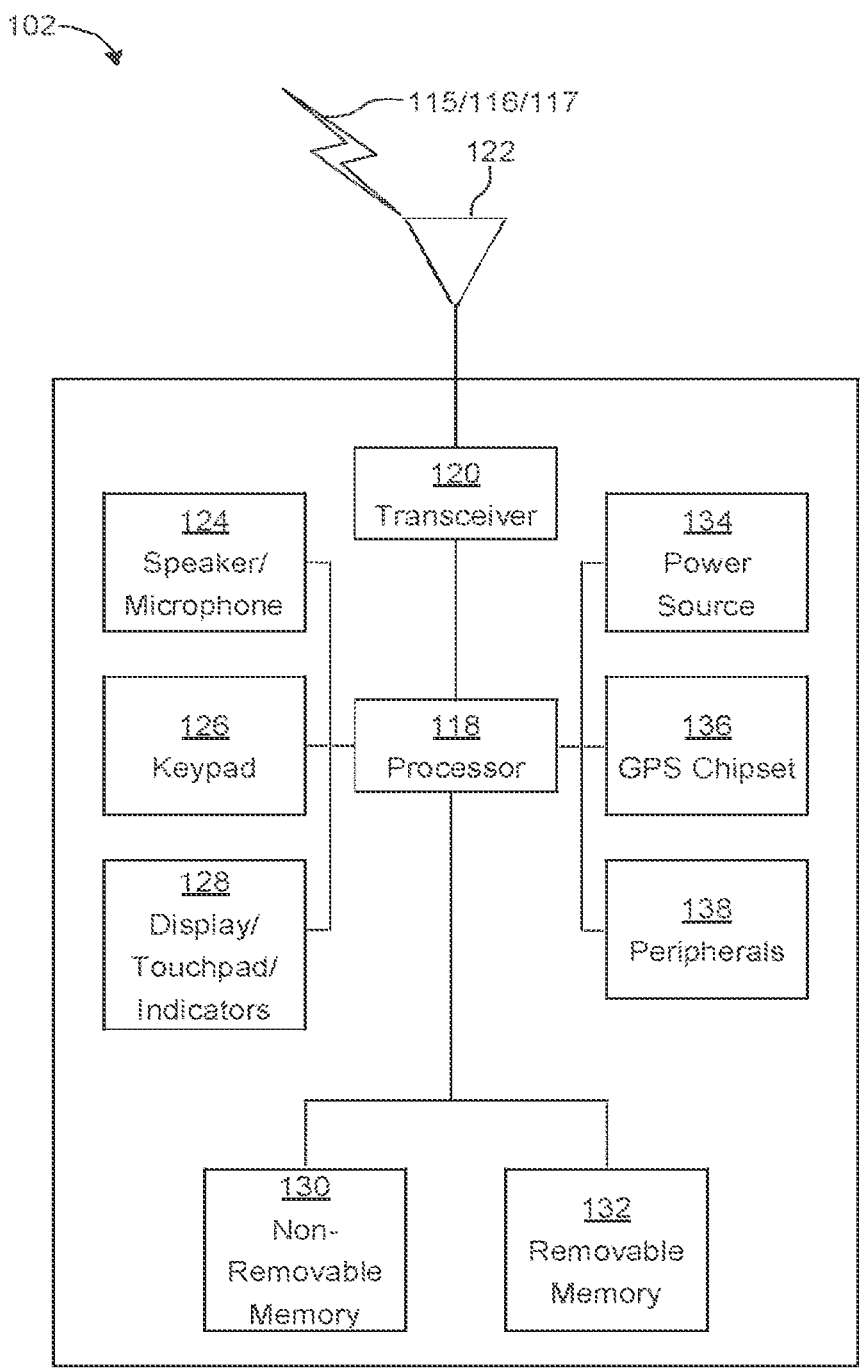
FIG. 11B is a block diagram of an example apparatus or device configured for wireless communications in accordance with the embodiments illustrated herein.

FIG. 11B is a block diagram of an example apparatus or device configured for wireless communications in accordance with the embodiments illustrated herein, such as for example, a WTRU 102. As shown in FIG. 11B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 11B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 11B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 11B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 11C:
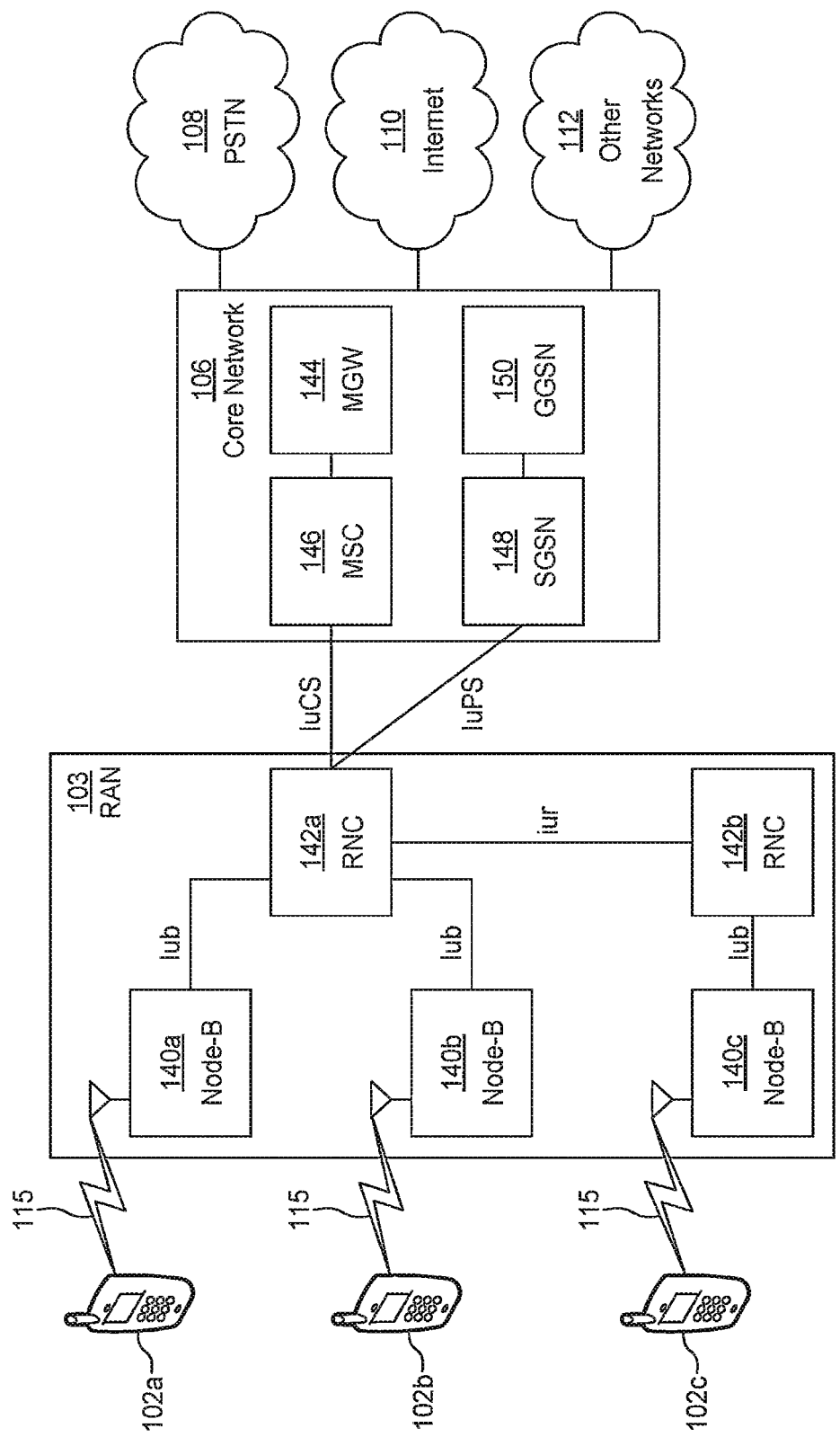
FIG. 11C is a system diagram of an example radio access network (RAN) and core network in accordance with an example embodiment.

FIG. 11C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 11C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 11C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 11C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 11D:
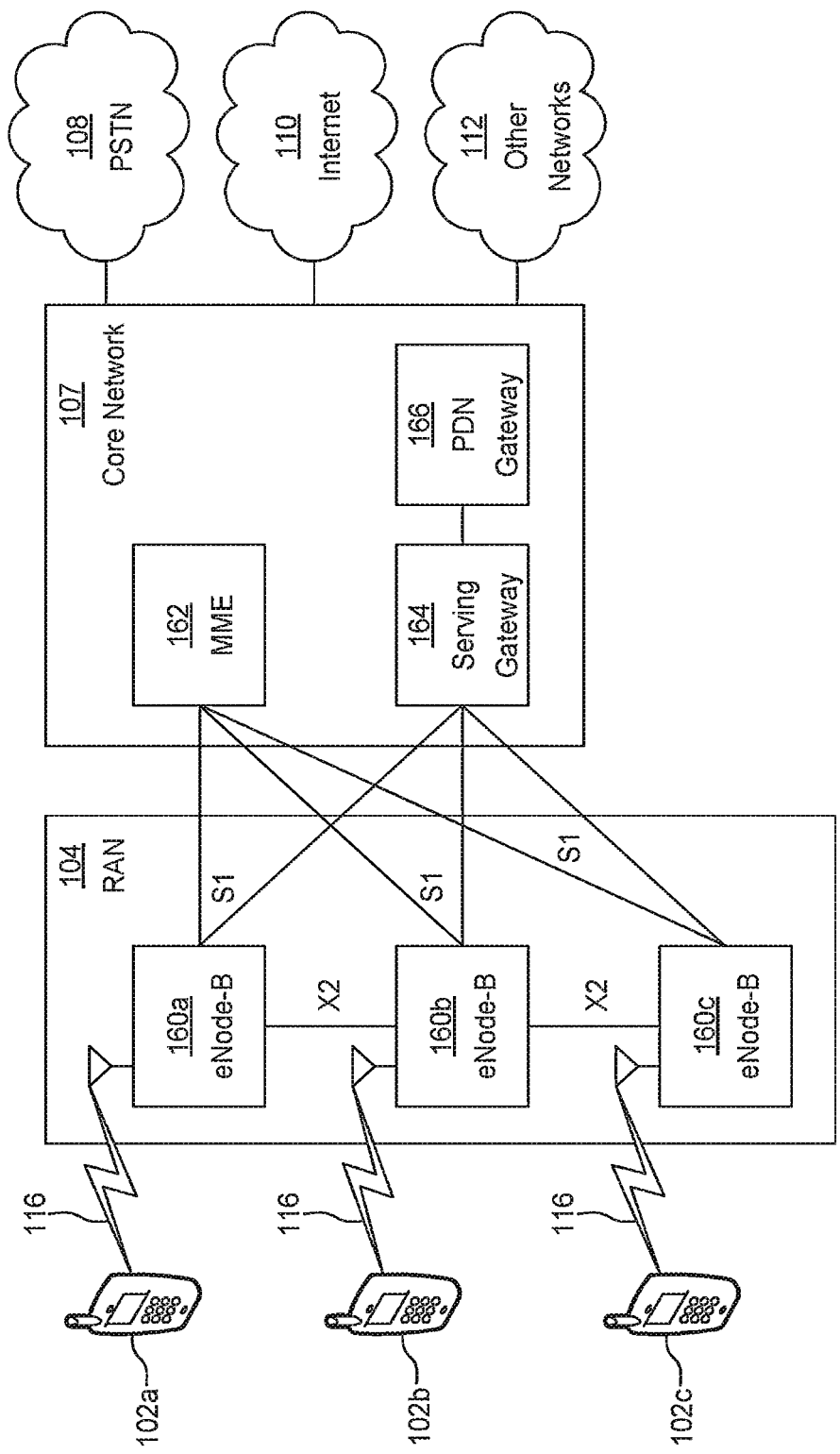
FIG. 11D is another system diagram of a RAN and core network according to another embodiment.

FIG. 11D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 11D, the eNode-Bs 160a, 160b, 160c may communicate with one another over an X2 interface.

The core network 107 shown in FIG. 11D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 11E:
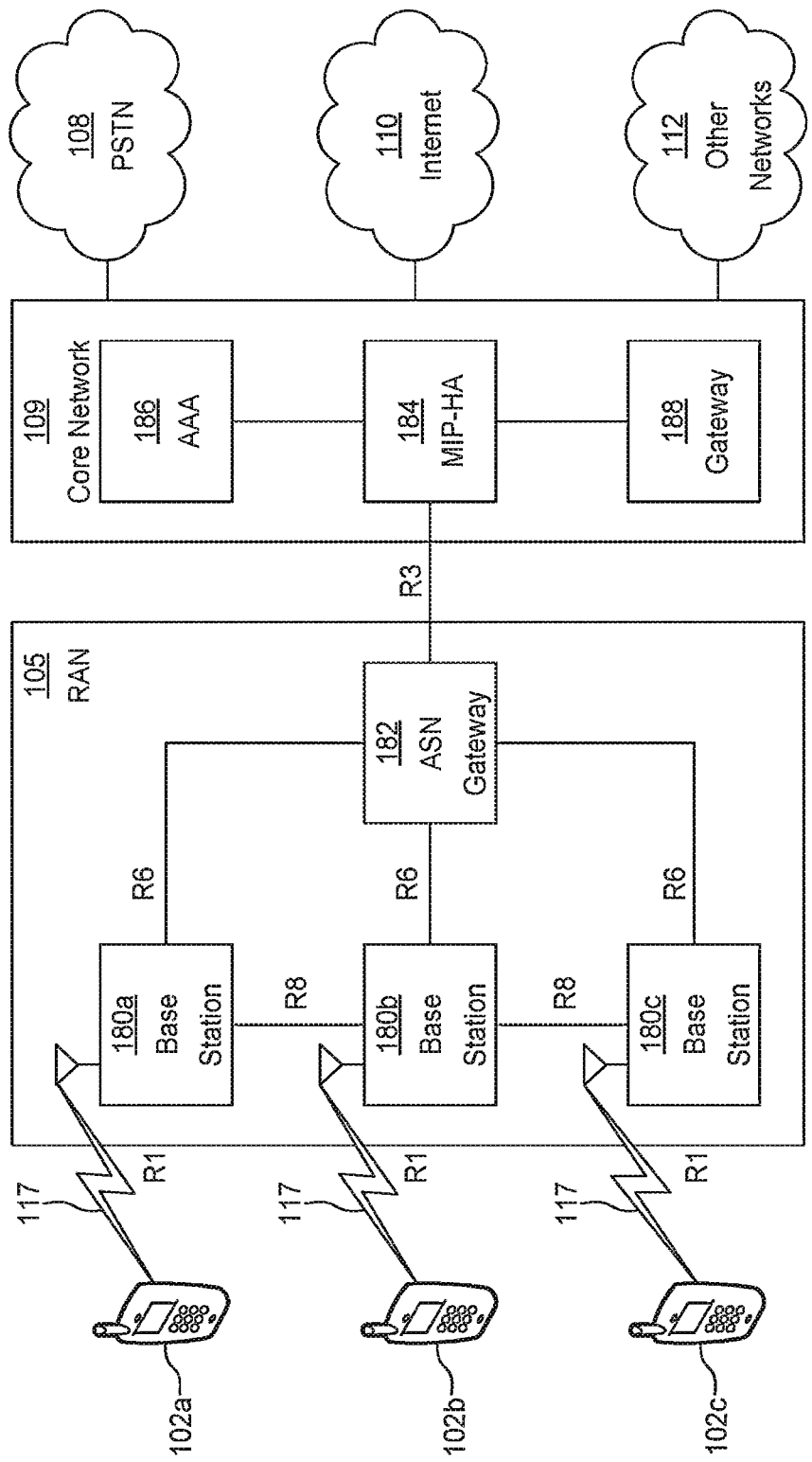
FIG. 11E is another system diagram of a RAN and core network according to another embodiment.

FIG. 11E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 11E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 11E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 11E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 11A, 11C, 11D, and 11E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 11A, 11B, 11C, 11D, and 11E are provided by way of example only, and it is understood that the subject matter disclosed and claimed herein may be embodied or implemented in any similar communication system, whether presently defined or defined in the future.

Figure 11F:
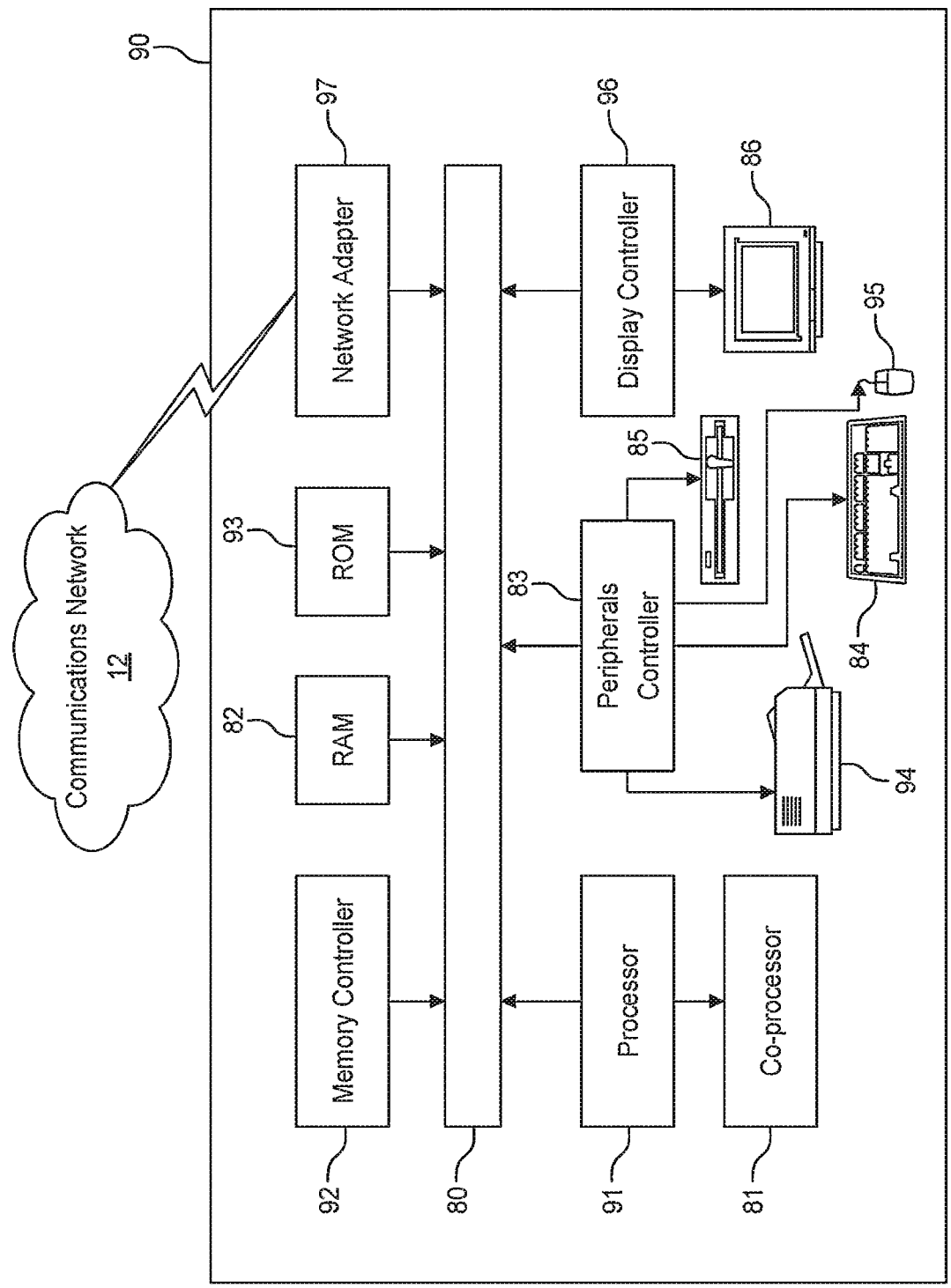
FIG. 11F is a block diagram of an exemplary computing system 90 in which one or more apparatuses of the communications networks illustrated in FIGS. 11A, 11C, 11D and 11E may be embodied.

FIG. 11F is a block diagram of an exemplary computing system 90 in which one or more apparatuses of the communications networks illustrated in FIGS. 11A, 11C, 11D and 11E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 11A, 11B, 11C, 11D, and 11E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 11G:
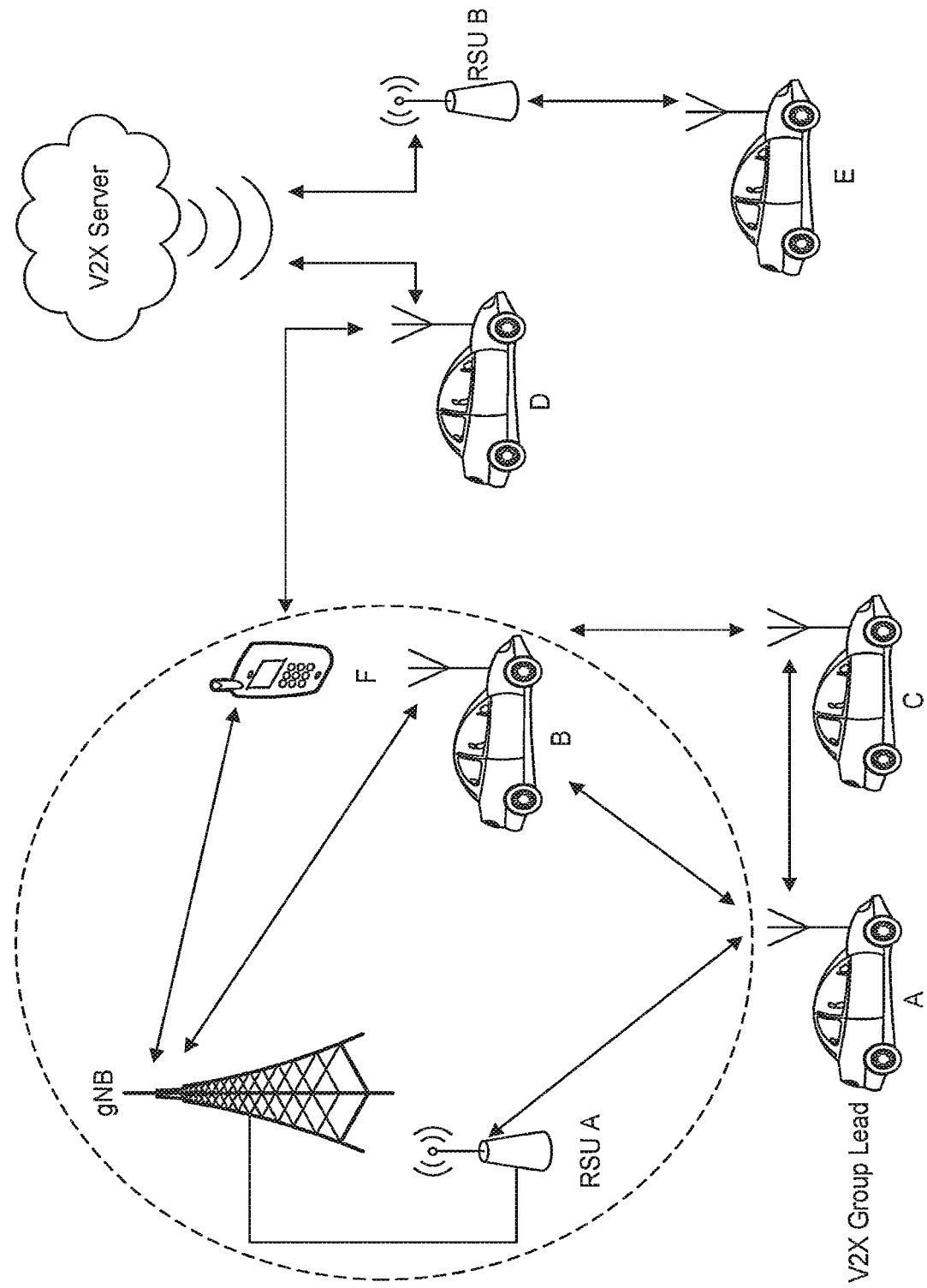
FIG. 11G illustrates one embodiment of another example communications system in which the methods and apparatuses described and claimed herein may be embodied.

FIG. 11G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The following Table includes a list of acronyms relating to service level technologies that may appear in the above description. Unless otherwise specified, the acronyms used herein refer to the corresponding term listed below.

TABLE 3

| | |
|---|---|
| 5GC | 5G Core Network |
| AF | Application Function |

TABLE 3-continued

| | |
|---|---|
| AKA | Authentication and Key Agreement |
| AMBR | Aggregate Maximum Bit Rate |
| AMF | Access and Mobility Management Function |
| API | Application Programming Interface |
| AUSF | Authentication Server Function |
| CDR | Charging Data Record |
| CM | Connection Management |
| DNN | Data Network Name |
| DRX | Discontinuous Reception |
| DPI | Deep Packet Inspection |
| EAP | Extensible Authentication Protocol |
| GUI | Graphical User Interface |
| GUTI | Globally Unique Temporary Identifier |
| HPLMN | Home PLMN |
| IMEI | International Mobile Equipment Identity |
| IETF | Internet Engineering Task Force |
| IMSI | International Mobile Subscriber Identity |
| LADN | Local Area Data Network |
| MAC | Media Access Control |
| MCC | Mobile Country Code |
| MICO | Mobile Initiated Connection Only |
| MNC | Mobile Network Code |
| MNO | Mobile Network Operator |
| MSIN | Mobile Subscription Identification Number |
| N3IWF | Non-3GPP Interworking Function |
| NAS | Non-Access Stratum |
| NF | Network Function |
| NRF | Network Repository Function |
| NSSP | Network Slice Selection Policy |
| NSSAI | Network Slice Selection Assistance Information |
| PANA | Protocol for Carrying Authentication for Network Access |
| PARLOS | Provision of Access to Restricted Local Operator Services |
| PC5 | ProSe (Proximity Services) Device-to-Device Interface |
| PCF | Policy Control Function |
| PDU | Protocol Data Unit |
| PEI | Permanent Equipment Identifier |
| PLMN | Public Land Mobile Network |
| QoS | Quality of Service |
| RAN | (Radio) Access Network |
| RLOS | Restricted Local Operator Services |
| RRC | Radio Resource Control |
| SD | Slice Differentiator |
| SIM | Subscriber Identification Module |
| SMS-SC | Short Message Service - Service Center |
| S-NSSAI | Single NSSAI |
| SSC | Session and Service Continuity |
| SSCMSP | SSC Mode Selection Policy |
| SST | Slice/Service Type |
| SUCI | Subscription Concealed Identifier |
| SUPI | Subscription Permanent Identifier |
| UDM | User Data Management |
| UDP | User Datagram Protocol |
| UDR | Unified Data Repository |
| UE | User Equipment |
| UPF | User Plane Function |
| URSP | UE Route Selection Policy |
| VPLMN | Visited PLMN |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A wireless transmit/receive unit comprising:
   a receiver configured to receive, from a capillary device in communication with the WTRU, a user identity associated with the capillary device;
   a transmitter configured to send, in response to a triggering event, a NAS request message to the network, the NAS request message including the user identity and PDU session information that is to be associated with the user identity; and
   the receiver further configured to receive a response from the network, the response including an indication of whether the PDU session information is allowed to be associated with the user identity.

2. The WTRU of claim 1, wherein the user identity identifies a human user of the capillary device, the capillary device in communication with the WTRU, or an application.

3. The WTRU of claim 1, wherein the triggering event comprises:
   the user identity being received by the WTRU;
   the WTRU transitioning from a locked state to an unlocked state and determining a user identity; or
   data being received, by the WTRU, from the capillary device in communication with the WTRU; or
   an Application invoking an API and providing a user identity.

4. The WTRU of claim 1, wherein the triggering event causes the WTRU to determine a Requested NSSAI and the Requested NSSAI is determined in the NAS request message.

5. The WTRU of claim 1, wherein the WTRU is further configured to:
   perform, using the user identity, an authentication with the network of a user associated with the user identity.

6. The WTRU of claim 1, wherein the PDU session information comprises an S-NSSAI or a PDU Session ID.

7. The WTRU of claim 1, wherein NAS request message triggers a procedure to authenticate the user identity.

8. The WTRU of claim 1, wherein the request message comprises a General Registration Request, a Service Request, a PDU Session Establishment Request, a PDU Modification Request, or a PDU Session Release Request.

9. The WTRU of claim 1, wherein the triggering event is a paging message or a non-access stratum (NAS) message being received by the WTRU, wherein the paging message or non-access stratum (NAS) message includes the user identity.

10. The WTRU of claim 1, wherein the transmitter is further configured to:
    send a second message to the network, the second message indicating that the WTRU supports receiving paging messages or NAS notifications that include the user identity.

11. The WTRU of claim 1, wherein the UE transmitter is further configured to:
    send a second NAS request message to the network to inform the network that the user identity is no longer associated with the WTRU.

12. The WTRU of claim 1, wherein the transmitter is further configured to:
    send a second NAS request message to the network to inform the network that the user identity is no longer associated with the WTRU and the second request message is a registration request.

13. The WTRU of claim 1, wherein the transmitter is further configure to:
send a second NAS request message to the network to inform the network that the user identity is no longer associated with the WTRU and the second request message is sent in response to a paging message or a NAS notification.

14. The WTRU of claim 1, wherein the request message comprises a list of users that are permitted to access the network via the WTRU.

15. The WTRU of claim 1, wherein the request message indicates the status of a plurality of users.

16. The WTRU of claim 1, wherein the response message indicates that a user identity is not authorized to use the WTRU to access the network.

17. The WTRU of claim 1, wherein the NAS request message indicates that the purpose of the request is to add or a remove a user association.

18. An apparatus comprising:
a receiver configured to receive a NAS Registration request message from a wireless transmit/receive unit (WTRU), the NAS Registration request message including a user identity associated with a capillary device and information that is to be associated with the WTRU wherein the user identity was received from the capillary device in communication with the WTRU, wherein the NAS Registration request message indicates an S-NSSAI that is to be associated with the user identity;
the apparatus further configured to determine if the user identity is permitted to be associated with the WTRU, wherein the NAS Registration request triggers a procedure that authenticates the user identity; and
a transmitter configured to send a response from the network, the response including an indication of whether the user identity is allowed to be associated with the WTRU.

19. The apparatus as recited in claim 18, wherein the WTRU uses the user identity to discover a PCF; and
wherein the apparatus provides the user-identity to the discovered PCF; and
wherein the apparatus obtains policies from the PCF; and
wherein the policies are associated with the user identity; and
the apparatus provides the policies to the WTRU.

* * * * *